United States Patent
Hsueh et al.

(10) Patent No.: US 10,330,894 B2
(45) Date of Patent: Jun. 25, 2019

(54) IMAGING OPTICAL LENS, IMAGING APPARATUS AND ELECTRONIC DEVICE

(71) Applicant: LARGAN PRECISION CO., LTD., Taichung (TW)

(72) Inventors: Chun-Che Hsueh, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/841,717

(22) Filed: Dec. 14, 2017

(65) Prior Publication Data

US 2019/0113714 A1    Apr. 18, 2019

(30) Foreign Application Priority Data

Oct. 16, 2017 (TW) .............................. 106135318 A

(51) Int. Cl.
*G02B 3/02* (2006.01)
*G02B 13/00* (2006.01)
*G02B 27/00* (2006.01)

(52) U.S. Cl.
CPC ..... *G02B 13/0045* (2013.01); *G02B 27/0025* (2013.01)

(58) Field of Classification Search
CPC ...... G02B 13/0045; G02B 9/62; G02B 13/18; G02B 27/0025; G02B 13/002; G02B 1/041; G02B 3/04; G02B 9/64; G02B 3/02; H04N 5/2254
See application file for complete search history.

(56) References Cited

U.S. PATENT DOCUMENTS

| | | | |
|---|---|---|---|
| 5,642,229 A | 6/1997 | Kaneko et al. | |
| 9,488,808 B1 | 11/2016 | Chen et al. | |
| 9,588,318 B2 | 3/2017 | Chen et al. | |
| 10,095,007 B1 | 10/2018 | Jhang et al. | |
| 2014/0071543 A1 | 3/2014 | Shinohara | |
| 2015/0338613 A1 | 11/2015 | Tang et al. | |
| 2015/0338614 A1 | 11/2015 | Tang et al. | |
| 2015/0338615 A1 | 11/2015 | Sun | |
| 2015/0370042 A1* | 12/2015 | Chen ................. | G02B 13/0045 359/713 |
| 2016/0124184 A1 | 5/2016 | Tang et al. | |
| 2016/0124186 A1 | 5/2016 | Tang et al. | |
| 2016/0131870 A1 | 5/2016 | Tang et al. | |
| 2016/0131871 A1 | 5/2016 | Tang et al. | |

(Continued)

FOREIGN PATENT DOCUMENTS

| CN | 106226888 A | 12/2016 |
|---|---|---|
| CN | 106324800 A | 1/2017 |

(Continued)

*Primary Examiner* — William R Alexander
*Assistant Examiner* — Balram T Parbadia
(74) *Attorney, Agent, or Firm* — Tim Tingkang Xia, Esq.; Locke Lord LLP

(57) ABSTRACT

An imaging optical lens includes six lens elements, the six lens elements being, in order from an object side to an image side: a first lens element; a second lens element having an image-side surface being concave in a paraxial region thereof, a third lens element having an object-side surface being convex in a paraxial region thereof, a fourth lens element, a fifth lens element, and a sixth lens element having negative refractive power.

29 Claims, 24 Drawing Sheets

(56) References Cited

U.S. PATENT DOCUMENTS

| | | |
|---|---|---|
| 2016/0313537 A1 | 10/2016 | Mercado |
| 2017/0219802 A1 | 8/2017 | Chen et al. |
| 2017/0235109 A1 | 8/2017 | Shin et al. |
| 2017/0248770 A1 | 8/2017 | Chen et al. |
| 2017/0299845 A1 | 10/2017 | Yao et al. |
| 2017/0351064 A1 | 12/2017 | Chang et al. |
| 2018/0074296 A1 | 3/2018 | Lee et al. |
| 2018/0172956 A1 | 6/2018 | Son |
| 2018/0180854 A1 | 6/2018 | Huh et al. |
| 2018/0321468 A1 | 11/2018 | Shih et al. |

FOREIGN PATENT DOCUMENTS

| | | |
|---|---|---|
| CN | 106324804 A | 1/2017 |
| CN | 106338815 A | 1/2017 |
| CN | 106842501 A | 6/2017 |
| CN | 106873129 A | 6/2017 |
| CN | 107367824 A | 11/2017 |
| CN | 107390354 A | 11/2017 |
| CN | 107783260 A | 3/2018 |
| JP | 2014232147 A | 12/2014 |
| JP | 2015222369 A | 12/2015 |
| TW | 201706665 A | 2/2017 |

\* cited by examiner

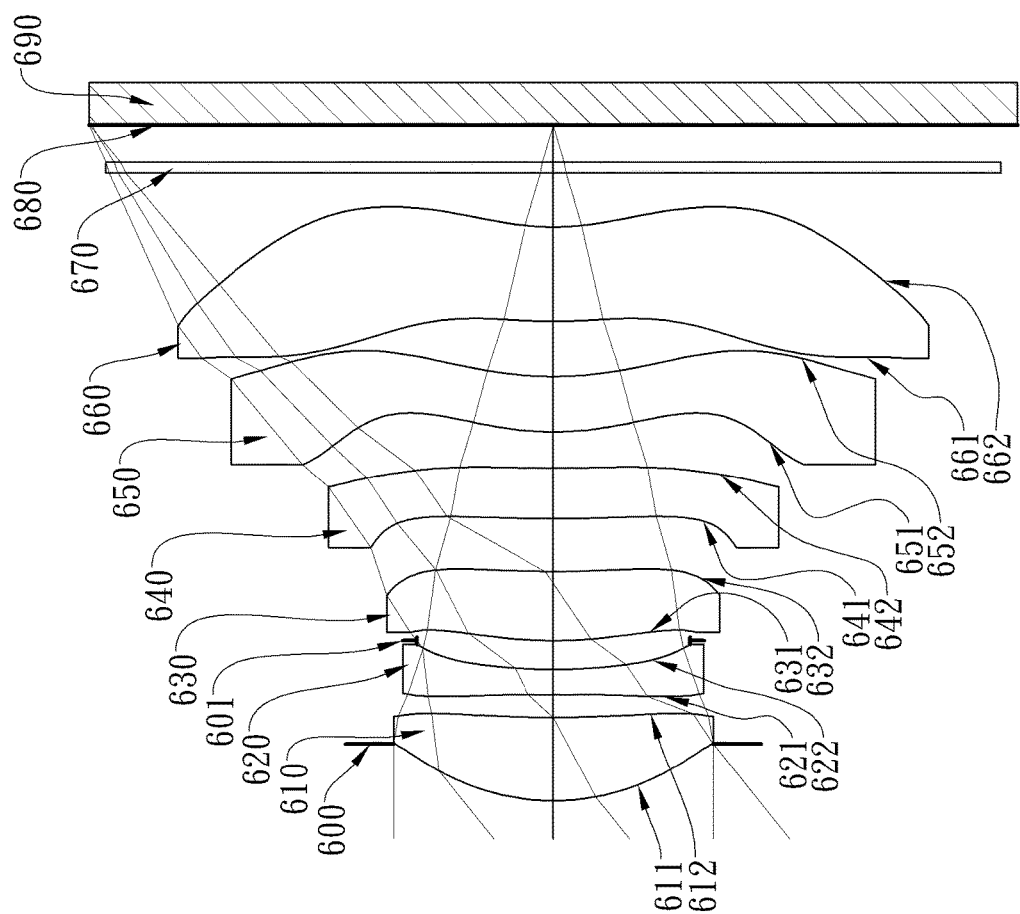

IMAGING OPTICAL LENS, IMAGING APPARATUS AND ELECTRONIC DEVICE

RELATED APPLICATIONS

This application claims priority to Taiwan Application Serial Number 106135318, filed on Oct. 16, 2017, which is incorporated by reference herein in its entirety.

BACKGROUND

Technical Field

The present disclosure relates to an imaging optical lens and an imaging apparatus, and more particularly, to an imaging optical lens and an imaging apparatus applicable to electronic devices.

Description of Related Art

With rapid developments in technology, shooting lenses are even wildly utilized in various fields such that demands to the shooting lenses with wide angle of view and high image quality are increasing. Meanwhile, for scenes such as dynamic photography and night shooting, shooting lenses with large aperture are indispensible. Also, with growing popularities of portable devices, requirements to the size of the shooting lenses are becoming even harsher.

Due to shapes and interspacing of lens elements of conventional shooting lenses not being properly arranged, balances among image qualities, view angles, apertures, and sizes cannot be easily obtained. Thus, miniaturized shooting lenses with high image quality, wide angle of view and large aperture are required.

SUMMARY

According to one aspect of the present disclosure, an imaging optical lens, includes six lens elements, the six lens elements being, in order from an object side to an image side: a first lens element having positive refractive power; a second lens element having an image-side surface being concave in a paraxial region thereof; a third lens element having an object-side surface being convex in a paraxial region thereof; a fourth lens element; a fifth lens element; and a sixth lens element having negative refractive power,
wherein at least one of an object-side surface of the sixth lens element and an image-side surface of the sixth lens element has at least one critical point in an off-axis region thereof, a central thickness of the second lens element is CT2, an axial distance between the first lens element and the second lens element is T12, a focal length of the imaging optical lens is f, a curvature radius of an object-side surface of the fourth lens element is R7, a curvature radius of an image-side surface of the fourth lens element is R8, a curvature radius of an image-side surface of the fifth lens element is R10, and the following conditions are satisfied:

$0<CT2/T12<1.75;$ $0\le f/|R7|+f/|R8|<1.32;$ and $0\le f/R10.$

According to another aspect of the present disclosure, an imaging apparatus includes the aforementioned imaging optical lens and an image sensor disposed on an image surface of the imaging optical lens.

According to another aspect of the present disclosure, an electronic device includes the aforementioned imaging apparatus.

According to another aspect of the present disclosure, an imaging optical lens, includes six lens elements, the six lens elements being, in order from an object side to an image side: a first lens element having positive refractive power; a second lens element having negative refractive power; a third lens element having an object side-surface being convex in a paraxial region thereof; a fourth lens element; a fifth lens element having positive refractive power; and a sixth lens element,
wherein at least one of an object-side surface of the fifth lens element, an image-side surface of the fifth lens element, an object-side surface of the sixth lens element, and an image-side surface of the sixth lens element has at least one critical point in an off-axis region thereof, a central thickness of the second lens element is CT2, an axial distance between the first lens element and the second lens element is T12, a focal length of the imaging optical lens is f, a curvature radius of an object-side surface of the fourth lens element is R7, a curvature radius of an image-side surface of the fourth lens element is R8, a curvature radius of the object-side surface of the fifth lens element is R9, a focal length of the first lens element is f1, a focal length of the sixth lens element is f6, and the following conditions are satisfied:

$0<CT2/T12<4.25;$ $0\le f/|R7|+f/|R8|<1.32;$ $0\le f/R9;$ and $0.30<|f1/f6|<0.90.$ According to another aspect of the present disclosure, an imaging optical lens, includes six lens elements, the six lens elements being, in order from an object side to an image side: a first lens element having positive refractive power; a second lens element having an object-side surface being convex in a paraxial region thereof; a third lens element having an object-side surface being convex in a paraxial region thereof; a fourth lens element; a fifth lens element; and a sixth lens element,
wherein a central thickness of the second lens element is CT2, an axial distance between the first lens element and the second lens element is T12, a focal length of the imaging optical lens is f, a curvature radius of an object-side surface of the fourth lens element is R7, a curvature radius of an image-side surface of the fourth lens element is R8, a curvature radius of an image-side surface of the fifth lens element is R10, a focal length of the first lens element is f1, a focal length of the sixth lens element is f6, and the following conditions are satisfied:

$0<CT2/T12<2.15;$ $0\le f/|R7|+f/|R8|\le1.00;$ $0\le f/R10;$ and $0.30<|f1/f6|<0.90.$

BRIEF DESCRIPTION OF THE DRAWINGS

FIG. 6A is a schematic view of an imaging apparatus according to the 6th embodiment of the present disclosure;

DETAILED DESCRIPTION

Figure 1A:
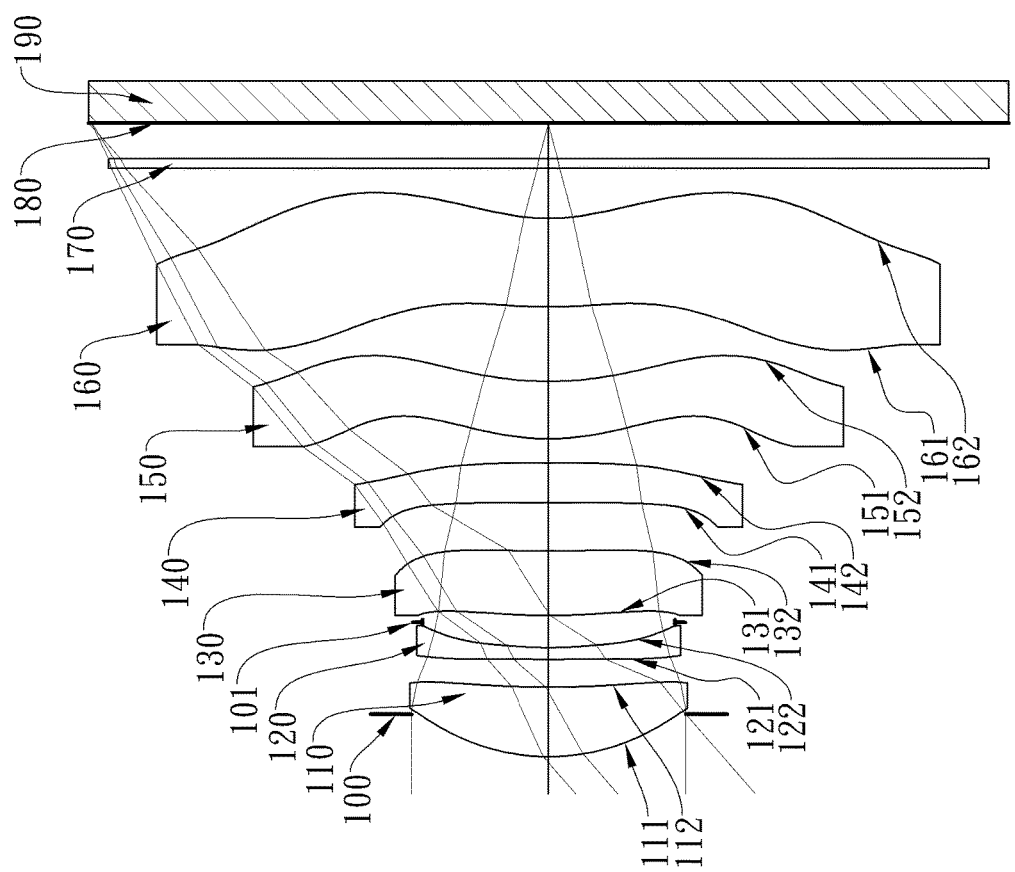
FIG. 1A is a schematic view of an imaging apparatus according to the 1st embodiment of the present disclosure.

The present disclosure provides an imaging optical lens including six lens elements, the six lens elements being, in order from an object side to an image side, a first lens element, a second lens element, a third lens element, a fourth lens element, a fifth lens element, and a sixth lens element.

The first lens element has positive refractive power such that a total track length of the lens can be reduced for miniaturization.

The second lens element may have negative refractive power such that aberrations resulted from the first lens element can be balanced. The second lens element may have an object-side surface being convex in a paraxial region thereof such that incident angle of light onto the second lens element can be reduced so as to reduce surface reflections and further reduce occurrences of stray light. The second lens element may have an image-side surface being concave such that corrections of astigmatisms can be enhanced.

The third lens element has an object-side surface being convex in a paraxial region such that occurrences of spherical aberrations can be reduced. Besides, the third lens element may have positive refractive power such that positive refractive power of the lens can be distributed for avoiding excess spherical aberrations due to a reduction of the total track length and reducing the sensitivity. The third lens element may have an image-side surface being concave in a paraxial region such that a principal point can be shifted toward the object side and the total track length can be favorably reduced.

The fifth lens element may have positive refractive power such that the distribution of the refractive power of the lens can be balanced for reducing aberrations and the sensitivity.

The sixth lens element may have negative refractive power for correcting Petzval sum of the lens so as to make an image surface more flat. The sixth lens element may have an object-side surface being convex in a paraxial region so as to favorably correct field curvature in an off-axis region and increase the image quality in a peripheral region. The sixth lens element may have an image-side surface being concave in a paraxial region so as to favorably reduce a back focal length and further reduce the total track length.

At least one of an object-side surface of the fifth lens element, an image-side surface of the fifth lens element, the object-side surface of the sixth lens element and the image-side surface of the sixth lens element has at least one critical point in an off-axis region thereof so as to correct off-axis aberrations and favorably adjust incident and exit angles of light in a peripheral region for reducing surface reflections. Incident angles of light onto the image surface can also be reduced such that response efficiency of an image sensor can be increased. Preferably, at least one of the object-side surface of the sixth lens element and the image-side surface of the sixth lens element has at least one critical point in the off-axis region thereof so as to further correct off-axis aberrations. Preferably, the image-side surface of the sixth lens element has at least one critical point in the off-axis region thereof.

When a central thickness of the second lens element is CT2, an axial distance between the first lens element and the second lens element is T12, and the following condition can be satisfied: $0<CT2/T12<4.25$, sufficient space can be provided between the first lens element and the second lens element and the second lens element can have suitable thickness thereby so as to correct aberrations resulted from the first lens element due to a reduction of the total track length and make the image sharper. Preferably, the following condition can be satisfied: $0<CT2/T12<2.15$. Preferably, the following condition can be satisfied: $0<CT2/T12<1.75$.

When a focal length of the imaging optical lens is f, a curvature radius of an object-side surface of the fourth lens element is R7, a curvature radius of an image-side surface of the fourth lens element is R8, and the following condition can be satisfied: $0 \leq f/|R7|+f/|R8|<1.32$, the shape of the fourth lens element can be adjusted so as to correct off-axis aberrations and suitable incident and exit angles of light onto the fourth lens element can be obtained such that area of the image surface can be favorably increased and outer diameters of lens elements located in the front end of the imaging optical lens can be reduced. Preferably, the following condition can be satisfied: $0 \leq f/|R7|+f/|R8| \leq 1.00$. Preferably, the following condition can be satisfied: $0 \leq f/|R7|+f/|R8| < 0.90$. Preferably, the following condition can be satisfied: $0 \leq f/|R7|+f/|R8| < 0.50$.

When the focal length of the imaging optical lens is f, a curvature radius of the object-side surface of the fifth lens element is R9, and the following condition can be satisfied: $0 \leq f/R9$, aberrations can be corrected while avoiding the shape of the fifth lens element from being overly curved such that difficulties in forming and assembling the lens elements can be decreased and a yield rate can be favorably increased.

When the focal length of the imaging optical lens is f, a curvature radius of the image-side surface of the fifth lens element is R10, and the following condition can be satisfied: $0 \leq f/R10$, shapes of the fifth lens element and the sixth lens element can function corporately for correcting off-axis aberrations.

When a focal length of the first lens element is f1, a focal length of the sixth lens element is f6, and the following condition can be satisfied: $|f1/f6|<1.10$, distributions of the refractive power of the lens can be adjusted such that the total track length can be suitably reduced for miniaturization. Preferably, the following condition can be satisfied: $|f1/f6|<0.90$. Preferably, the following condition can be satisfied: $0.30<|f1/f6|<0.90$.

When a maximum refractive index among refractive indices of the six lens element is Nmax, and the following condition can be satisfied: $1.650 \leq Nmax<1.750$, distributions of the refractive power of the lens can be adjusted such that light can be refracted more easily so as to favorably correct aberrations and reduce volume.

When an Abbe number of the third lens element is V3, an Abbe number of the fourth lens element is V4, and the following condition can satisfied: $58.0<V3+V4<103.0$, arrangements of materials of the third lens element and the fourth lens element can be adjusted so as to favorably reduce aberrations such as chromatic aberrations.

When the Abbe number of the third lens element is V3, the Abbe number of the fourth lens element is V4, and the following conditions can be satisfied: $|V3-V4|<24.0$, the third lens element and the fourth lens element can function corporately with each other for favorably reducing off-axis aberrations.

When the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions can be satisfied: $T12/T56<1.0$, $T23/T56<1.0$, $T34/T56<1.0$, and $T45/T56<1.0$, arrangements of spacing between the lens element can be suitably adjusted so as to favorably correct off-axis aberrations and reduce the total track length.

When the axial distance between the first lens element and the second lens element is T12, the axial distance between the third lens element and the fourth lens element is T34, and the following condition can be satisfied: $1.21<T34/T12<5.70$, spacing between the lens elements can be maintained in suitable ratio so as to favorably reduce the size and increase angle of view of the lens.

When a maximum axial distance between any two adjacent lens elements among the six lens elements is ATmax, a minimum axial distance between any two adjacent lens elements among the six lens elements is ATmin, and the following condition can be satisfied: $1.0<ATmax/ATmin<5.0$, a certain spacing can be maintained between the lens elements so as to favorably correct off-axis aberrations.

When the focal length of the imaging optical lens is f, a curvature radius of the object-side surface of the third lens element is R5, a curvature radius of the image-side surface of the third lens element is R6, and the following condition can be satisfied: $1.05<f/|R5|+f/|R6|<6.00$, shape of the third lens element can be adjusted so as to favorably correct off-axis aberrations and reduce volume.

When the focal length of the imaging optical lens is f, a composite focal length of the third lens element and the fourth lens element is f34, and the following condition can be satisfied: $0<f34/f<10.0$, the third lens element and the fourth lens element can function cooperatively with each other such that the refractive power can be maintained in a suitable strength so as to favorably reduce the total track length and adjust optical path for increasing illuminations onto the image surface.

When the focal length of the imaging optical lens is f, a composite focal length of the fourth lens element and the fifth lens element is f45, and the following condition can be satisfied: $0<f45/f<6.60$, the fourth lens element and the fifth lens element can function corporately with each other for reducing off-axis aberrations.

When an axial distance between an object-side surface of the first lens element and the image surface is TL, an entrance pupil diameter of the imaging optical lens is EPD, and the following condition can be satisfied: $0.8<TL/EPD<2.4$, the total track length can be reduced and the aperture can be enlarged such that a suitable ratio can be maintained so as to reduce difficulties while manufacturing.

When the axial distance between the object-side surface of the first lens element and the image surface is TL, a maximum image height of the imaging optical lens is ImgH, and the following condition can be satisfied: $0.8<TL/ImgH<1.5$, the total track length can be reduced, the area of the image surface can be increased and incident angle of light onto the image surface can be suitable adjusted so as to maintain the response efficiency of the image sensor.

When at least five lens elements among the sixth lens elements have both a curvature radius of an object-side surface and a curvature radius of an image-side surface thereof being positive, the lens can be suitably utilized in the design of large aperture and short total track length.

When the focal length of the imaging optical lens is f, a focal length of the fifth lens element is f5, and the following condition can be satisfied: $1.6<f5/f<10$, the fifth lens element can have suitable amount of positive refractive power so as to favorably reduce the total track length.

When three consecutive lens elements among the six lens elements have Abbe numbers lower than 48, functions of the lens to correct chromatic aberration can be distributed so as to reduce sensitivities of the lens elements and increase a yield rate while manufacturing and assembling.

Each of the aforementioned features of the imaging optical lens can be utilized in numerous combinations, so as to achieve the corresponding effects.

According to the imaging optical lens of the present disclosure, the critical point is a non-axial point on the surface of the lens element where a tangential plane of the point is perpendicular to an optical axis.

According to the imaging optical lens of the present disclosure, the lens elements thereof can be made of glass or plastic material. When the lens elements are made of glass material, the distribution of the refractive power of the imaging optical lens may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required quantity of lens elements, the total track length of the imaging optical lens can be effectively reduced.

According to the imaging optical lens of the present disclosure, if a surface of a lens element is aspheric, it means that the surface has an aspheric shape throughout its optically effective area, or a portion(s) thereof.

According to the imaging optical lens of the present disclosure, the imaging optical lens can include at least one stop, such as an aperture stop, a glare stop or a field stop, so as to favorably reduce the amount of stray light and thereby improving the image quality.

According to the imaging optical lens of the present disclosure, the aperture stop can be configured as a front stop or a middle stop. The front stop disposed between an imaged object and the first lens element can provide a longer distance between the exit pupil and the image surface so that there is a telecentric effect for improving the image-sensing efficiency of an image sensor, such as a CCD or CMOS sensor. The middle stop disposed between the first lens element and the image surface is favorable for enlarging the field of view, thereby providing the imaging optical lens with the advantage of a wide-angle lens.

According to the imaging optical lens of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the imaging optical lens of the present disclosure, the image surface of the imaging optical lens, based on the corresponding image sensor, can be a plane or a curved surface with an arbitrary curvature, especially a curved surface being concave facing towards the object side. Meanwhile, the imaging optical lens of the present disclosure may optionally include one or more image correction components (such as a field flattener) between the image surface and the most nearing lens element to the image surface so as to achieve the effect of image correction (such as the field curvature). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. In general, a preferred image correction component may be a thin plano-concave component having a surface being concave toward the object side and be arranged near to the image surface.

According to the above descriptions of the present disclosure, the following 1st-12th specific embodiments are provided for further explanation.

1st Embodiment

Figure 1B:
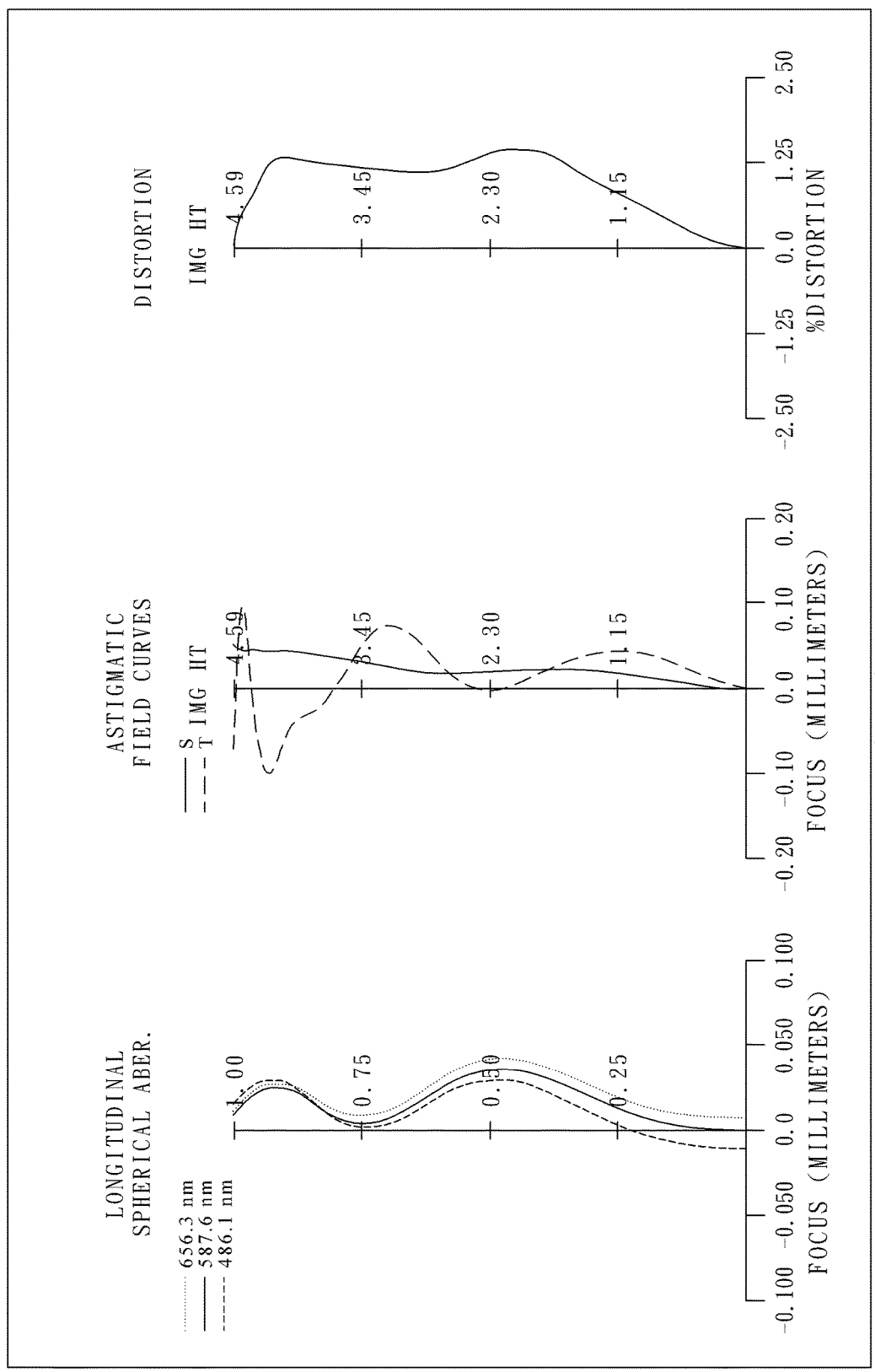
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an imaging optical lens (not otherwise herein labeled) of the present disclosure and an image sensor 190. The imaging optical lens includes six lens elements, the six lens elements being, in order from an object side to an image side, a first lens element 110, a second lens element 120, a third lens element 130, a fourth lens element 140, a fifth lens element 150, and a sixth lens element 160 and no other lens elements are inserted between the first lens element 110 and the sixth lens element 160.

The first lens element 110 with positive refractive power has an object-side surface 111 being convex in a paraxial region thereof, an image-side surface 112 being concave in a paraxial region thereof, and both the object-side surface 111 and the image-side surface 112 being aspheric. The first lens element 110 is made of plastic material.

The second lens element 120 with negative refractive power has an object-side surface 121 being convex in a paraxial region thereof, an image-side surface 122 being concave in a paraxial region thereof, and both the object-side surface 121 and the image-side surface 122 being aspheric. The second lens element 120 is made of plastic material.

The third lens element 130 with positive refractive power has an object-side surface 131 being convex in a paraxial region thereof, an image-side surface 132 being concave in a paraxial region thereof, and both the object-side surface 131 and the image-side surface 132 being aspheric. The third lens element 130 is made of plastic material.

The fourth lens element 140 has an object-side surface 141 being planar in a paraxial region thereof, an image-side surface 142 being planar in a paraxial region thereof, and both the object-side surface 141 and the image-side surface 142 being aspheric. The fourth lens element 140 is made of plastic material.

The fifth lens element 150 with positive refractive power has an object-side surface 151 being convex in a paraxial region thereof, an image-side surface 152 being concave in a paraxial region thereof, both the object-side surface 151 and the image-side surface 152 being aspheric, and at least one critical point in both an off-axis region of the object-side surface 151 and an off-axis region of the image-side surface 152 thereof. The fifth lens element 150 is made of plastic material.

The sixth lens element 160 with negative refractive power has an object-side surface 161 being convex in a paraxial region thereof, an image-side surface 162 being concave in a paraxial region thereof, both the object-side surface 161 and the image-side surface 162 being aspheric, and at least one critical point in both an off-axis region of the object-side surface 161 and an off-axis region of the image-side surface 162 thereof. The sixth lens element 160 is made of plastic material.

In the imaging optical lens, each of the first lens element 110, the second lens element 120, the third lens element 130, the fifth lens element 150 and the sixth lens element 160 has both a curvature radius of the object-side surface and a curvature radius of the image-side surface thereof being positive. Three consecutive lens elements, the second lens element 120, the third lens element 130, and the fourth lens element 140, have Abbe numbers lower than 48.

The imaging optical lens further includes an aperture stop 100 disposed at an object side of the first lens element 110, a stop 101 disposed between the second lens element 120 and the third lens element 130, and a filter 170 disposed between the sixth lens element 160 and an image surface 180. The filter 170 is made of glass material and will not affect a focal length of the imaging optical lens. The image sensor 190 is disposed on or near the image surface 180 of the imaging optical lens.

Figure 11:
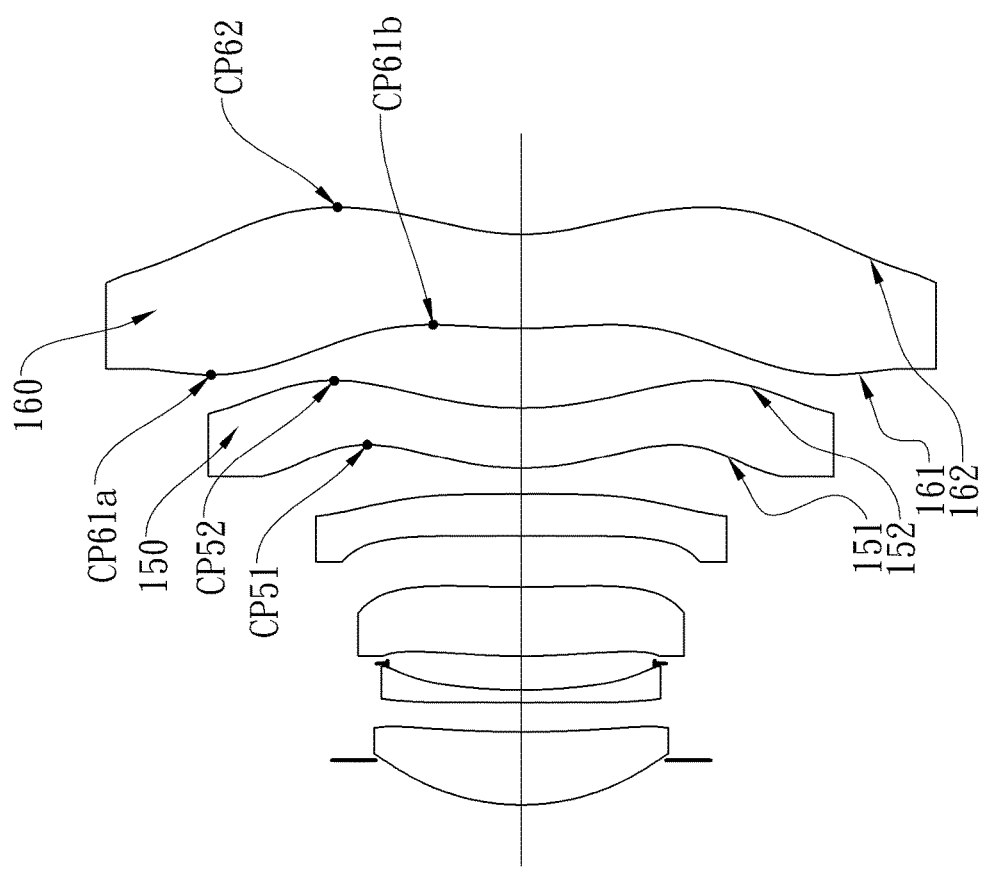
FIG. 11 is a schematic view showing at least one critical point CP51, CP52, CP61a, CP61b, CP62 of the 1st embodiment of the present disclosure as an example.

Please refer to FIG. 11, which is a schematic view showing the at least one critical point of the 1st embodiment of the present disclosure as an example. Please note the definitions of these characters exemplarily shown in FIG. 11 are also applicable to any one of the other embodiments of the present disclosure. The fifth lens element 150 has the at least one critical point CP51 in the off-axis region of the object-side surface 151 thereof and the at least one critical point CP52 in the off-axis region of the image-side surface 152 thereof. The sixth lens element 160 has the at least one critical point CP61a, CP61b in the off-axis region of the object-side surface 161 thereof and the at least one critical point CP62 in the off-axis region of the image-side surface 162 thereof.

The detailed optical data of the 1st embodiment are shown in TABLE 1, and the aspheric surface data are shown in TABLE 2, wherein the units of the curvature radius, the thickness and the focal length are expressed in mm, f is the focal length of the imaging optical lens, Fno is an f-number of the imaging optical lens, and HFOV is half of a maximal field of view, and surfaces #1 to #17 refer to the surfaces in order from the object side to the image side. The aspheric surface data are shown in TABLE 2, wherein k is the conic coefficient in the equation of the aspheric surface profiles, and A4-A20 refer to the 4th to 20th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 5.25 mm, Fno = 1.90, HFOV = 41.1 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.425 | | | | |
| 2 | Lens 1 | 2.162 | ASP | 0.698 | Plastic | 1.545 | 56.1 | 5.12 |
| 3 | | 8.533 | ASP | 0.278 | | | | |
| 4 | Lens 2 | 13.178 | ASP | 0.120 | Plastic | 1.660 | 20.4 | −8.33 |
| 5 | | 3.864 | ASP | 0.252 | | | | |
| 6 | Stop | Planar | | 0.069 | | | | |
| 7 | Lens 3 | 5.673 | ASP | 0.656 | Plastic | 1.559 | 40.4 | 15.58 |
| 8 | | 15.606 | ASP | 0.486 | | | | |
| 9 | Lens 4 | ∞ | ASP | 0.399 | Plastic | 1.559 | 40.4 | ∞ |
| 10 | | ∞ | ASP | 0.245 | | | | |
| 11 | Lens 5 | 2.498 | ASP | 0.577 | Plastic | 1.544 | 56.0 | 13.21 |
| 12 | | 3.518 | ASP | 0.756 | | | | |
| 13 | Lens 6 | 4.766 | ASP | 0.890 | Plastic | 1.544 | 56.0 | −7.54 |
| 14 | | 2.059 | ASP | 0.500 | | | | |
| 15 | Filter | Planar | | 0.100 | Glass | 1.517 | 64.2 | — |
| 16 | | Planar | | 0.358 | | | | |
| 17 | Image Surface | Planar | | — | | | | |

* Reference wavelength is d-line 587.6 nm.
* The effective radius of Surface 6 is 1.270 mm.
* The effective radius of Surface 10 is 1.950 mm.

TABLE 2

Aspheric Coefficients

| Surface # | 2 | 3 | 4 | 5 |
|---|---|---|---|---|
| k = | −3.2547E−01 | −6.6399E+01 | −9.0000E+01 | −2.1935E+01 |
| A4 = | 2.5735E−03 | −1.7761E−02 | −1.7737E−01 | −1.3867E−01 |
| A6 = | −1.2145E−03 | 2.9291E−02 | 3.4806E−01 | 3.4401E−01 |
| A8 = | 6.4968E−03 | −3.1673E−02 | −3.2582E−01 | −3.3036E−01 |
| A10 = | −7.5858E−03 | 2.1695E−02 | 1.7981E−01 | 1.9052E−01 |
| A12 = | 4.0570E−03 | −9.3357E−03 | −5.7820E−02 | −6.4197E−02 |
| A14 = | −9.8352E−04 | 1.5253E−03 | 8.5213E−03 | 9.7725E−03 |

| Surface # | 7 | 8 | 9 | 10 |
|---|---|---|---|---|
| k = | −2.2330E+01 | 2.5111E+01 | 0.0000E+00 | 0.0000E+00 |
| A4 = | −3.8059E−02 | −1.2922E−02 | −9.4250E−03 | −4.6520E−02 |
| A6 = | −3.8656E−03 | −6.8687E−02 | 8.1702E−03 | 1.4982E−02 |
| A8 = | 4.5625E−02 | 1.1210E−01 | −1.5835E−02 | −5.7260E−03 |
| A10 = | −6.2483E−02 | −1.0872E−01 | 9.5935E−03 | 2.2839E−03 |
| A12 = | 3.5329E−02 | 5.8010E−02 | −2.9297E−03 | −4.3983E−04 |
| A14 = | −8.1255E−03 | −1.6394E−02 | 3.0437E−04 | 2.9993E−05 |
| A16 = | | 1.8758E−03 | | |

| Surface # | 11 | 12 | 13 | 14 |
|---|---|---|---|---|
| k = | −4.0478E+00 | −1.3200E+01 | −3.1338E+00 | −1.0527E+00 |
| A4 = | −8.4610E−03 | 3.8627E−02 | −9.4669E−02 | −1.0137E−01 |
| A6 = | −1.3670E−02 | −2.8000E−02 | 2.4880E−02 | 3.1058E−02 |
| A8 = | 2.9226E−03 | 7.0978E−03 | −4.6318E−03 | −7.5423E−03 |
| A10 = | −5.0307E−04 | −1.0039E−03 | 7.9687E−04 | 1.2278E−03 |
| A12 = | 1.0506E−04 | 7.7280E−05 | −1.1540E−04 | −1.2911E−04 |
| A14 = | −9.7766E−06 | −2.4653E−06 | 1.1987E−05 | 8.6462E−06 |
| A16 = | 1.9987E−07 | 7.4025E−10 | −7.9640E−07 | −3.5383E−07 |

TABLE 2-continued

Aspheric Coefficients

| | | |
|---|---|---|
| A18 = | 2.9864E−08 | 7.9963E−09 |
| A20 = | −4.7800E−10 | −7.5726E−11 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the imaging optical lens is f, the f-number of the imaging optical lens is Fno, half of the maximal field of view of the imaging optical lens is HFOV, and these parameters have the following values: f=5.25 mm; Fno=1.90; and HFOV=41.1 degrees.

In the 1st embodiment, a maximum refractive index among refractive indices of the six lens element is Nmax, and it satisfies the condition: Nmax=1.660, which is the refractive index of the second lens element 120.

In the 1st embodiment, an Abbe number of the third lens element 130 is V3, an Abbe number of the fourth lens element 140 is V4, and they satisfy the condition: V3+V4=80.9.

In the 1st embodiment, the Abbe number of the third lens element 130 is V3, the Abbe number of the fourth lens element 140 is V4, and they satisfy the condition: |V3−V4|=0.

In the 1st embodiment, a maximum axial distance between any two adjacent lens elements among the six lens elements is ATmax, a minimum axial distance between any two adjacent lens elements among the six lens elements is ATmin, and they satisfy the condition: ATmax/ATmin=3.09. In the present embodiment, ATmax=0.756 (mm), which is an axial distance between the fifth lens element 150 and the sixth lens element 160, and ATmin=0.245 (mm), which is an axial distance between the fourth lens element 140 and the fifth lens element 150.

In the 1st embodiment, a central thickness of the second lens element 120 is CT2, an axial distance between the first lens element 110 and the second lens element 120 is T12, and they satisfy the condition: CT2/T12=0.43.

In the 1st embodiment, the axial distance between the first lens element 110 and the second lens element 120 is T12, the axial distance between the fifth lens element 150 and the sixth lens element 160 is T56, and they satisfy the condition: T12/T56=0.37.

In the 1st embodiment, an axial distance between the second lens element 120 and the third lens element 130 is T23, the axial distance between the fifth lens element 150 and the sixth lens element 160 is T56, and they satisfy the condition: T23/T56=0.42.

In the 1st embodiment, the axial distance between the first lens element 110 and the second lens element 120 is T12, an axial distance between the third lens element 130 and the fourth lens element 140 is T34, and they satisfy the condition: T34/T12=1.75.

In the 1st embodiment, the axial distance between the third lens element 130 and the fourth lens element 140 is T34, the axial distance between the fifth lens element 150 and the sixth lens element 160 is T56, and they satisfy the condition: T34/T56=0.64.

In the 1st embodiment, the axial distance between the fourth lens element 140 and the fifth lens element 150 is T45, the axial distance between the fifth lens element 150 and the sixth lens element 160 is T56, and they satisfy the condition: T45/T56=0.32.

In the 1st embodiment, the focal length of the imaging optical lens is f, a curvature radius of the object-side surface 131 of the third lens element 130 is R5, a curvature radius of the image-side surface 132 of the third lens element 130 is R6, and they satisfy the condition: f/|R5|+f/|R6|=1.26.

In the 1st embodiment, the focal length of the imaging optical lens is f, a curvature radius of the object-side surface 141 of the fourth lens element 140 is R7, a curvature radius of the image-side surface 142 of the fourth lens element 140 is R8, and they satisfy the condition: f/|R7|+f/|R8|=0.00.

In the 1st embodiment, the focal length of the imaging optical lens is f, a curvature radius of the object-side surface 151 of the fifth lens element 150 is R9, and they satisfy the condition: f/R9=2.10.

In the 1st embodiment, the focal length of the imaging optical lens is f, a curvature radius of the image-side surface 152 of the fifth lens element 150 is R10, and they satisfy the condition: f/R10=1.49.

In the 1st embodiment, a focal length of the first lens element 110 is f1, a focal length of the sixth lens element 160 is f6, and they satisfy the condition: |f1/f6|=0.68.

In the 1st embodiment, the focal length of the imaging optical lens is f, a composite focal length of the third lens element 130 and the fourth lens element 140 is f34, and they satisfy the condition: f34/f=2.97.

In the 1st embodiment, the focal length of the imaging optical lens is f, a composite focal length of the fourth lens element 140 and the fifth lens element 150 is f45, and they satisfy the condition: f45/f=2.52.

In the 1st embodiment, the focal length of the imaging optical lens is f, a focal length of the fifth lens element 150 is f5, and they satisfy the condition: f5/f=2.52.

In the 1st embodiment, an axial distance between the object-side surface 111 of the first lens element 110 and the image surface 180 is TL, an entrance pupil diameter of the imaging optical lens is EPD, and they satisfy the condition: TL/EPD=2.31.

In the 1st embodiment, the axial distance between the object-side surface 111 of the first lens element 110 and the image surface 180 is TL, a maximum image height of the imaging optical lens is ImgH, and they satisfy the condition: TL/ImgH=1.39.

2nd Embodiment

Figure 2A:
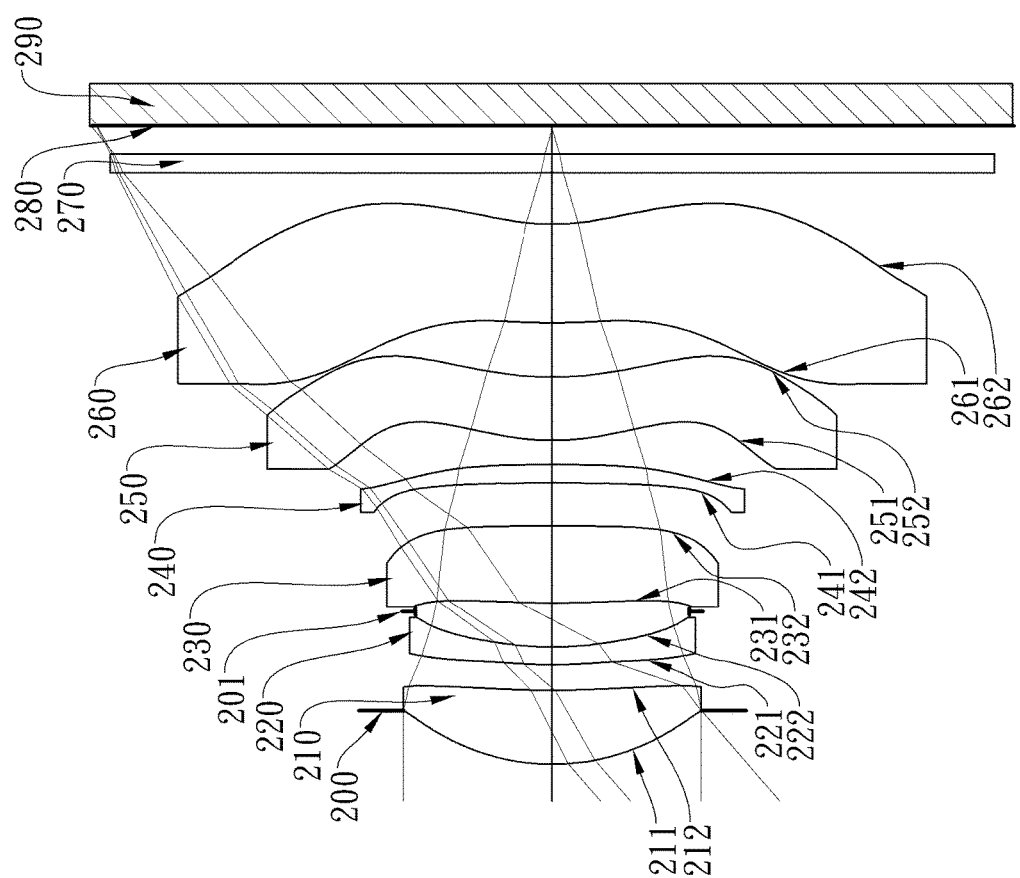
FIG. 2A is a schematic view of an imaging apparatus according to the 2nd embodiment of the present disclosure.
Figure 2B:
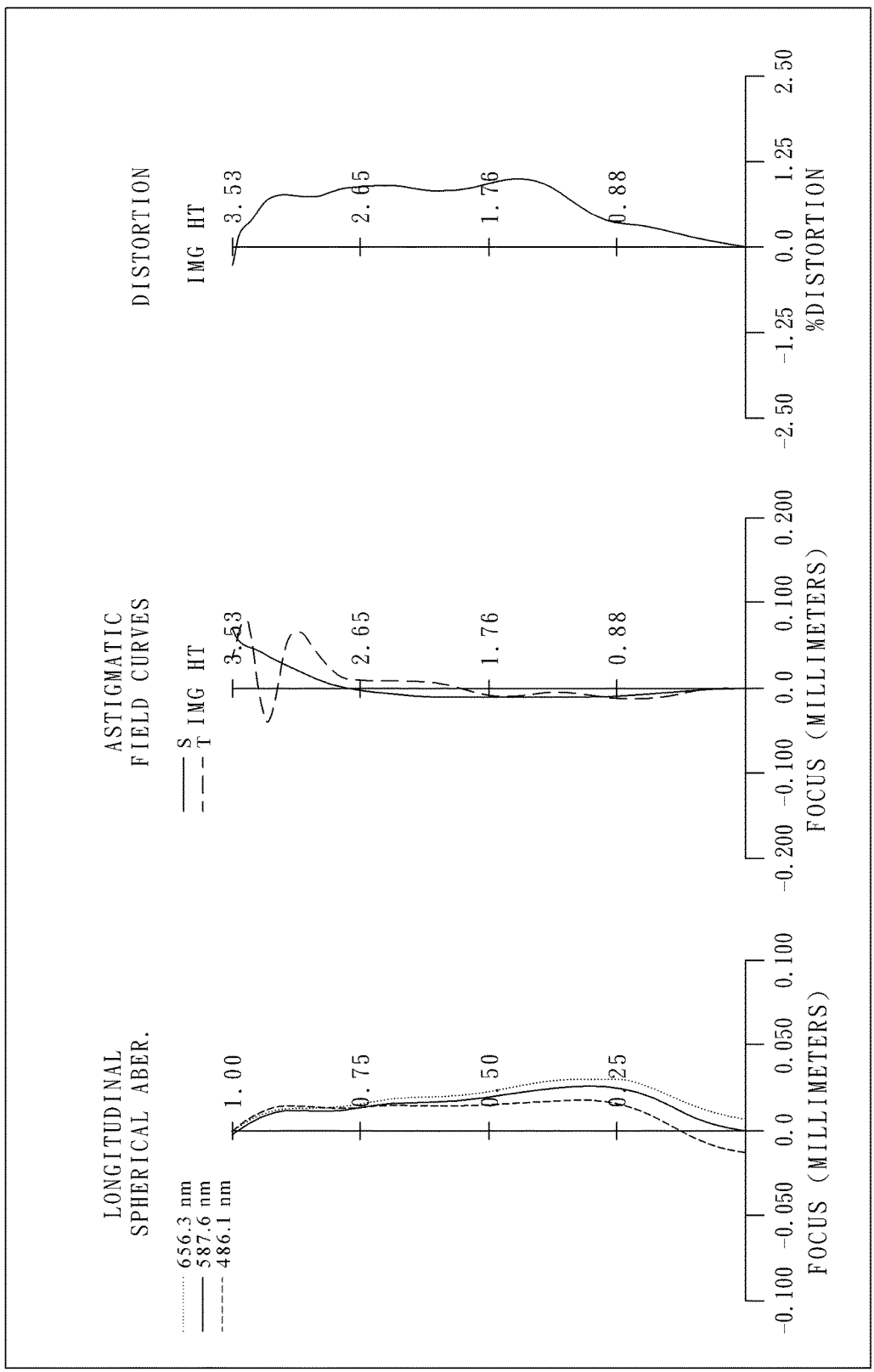
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an imaging optical lens (not otherwise herein labeled) of the present disclosure and an image sensor 290. The imaging optical lens includes six lens elements, the six lens elements being, in order from an object side to an image side, a first lens element 210, a second lens element 220, a third lens element 230, a fourth lens element 240, a fifth lens element 250, and a sixth lens element 260 and no other lens elements are inserted between the first lens element 210 and the sixth lens element 260.

The first lens element 210 with positive refractive power has an object-side surface 211 being convex in a paraxial region thereof, an image-side surface 212 being concave in a paraxial region thereof, and both the object-side surface 211 and the image-side surface 212 being aspheric. The first lens element 210 is made of plastic material.

The second lens element 220 with negative refractive power has an object-side surface 221 being convex in a paraxial region thereof, an image-side surface 222 being concave in a paraxial region thereof, and both the object-side surface 221 and the image-side surface 222 being aspheric. The second lens element 220 is made of plastic material.

The third lens element 230 with positive refractive power has an object-side surface 231 being convex in a paraxial region thereof, an image-side surface 232 being convex in a paraxial region thereof, and both the object-side surface 231 and the image-side surface 232 being aspheric. The third lens element 230 is made of plastic material.

The fourth lens element 240 with negative refractive power has an object-side surface 241 being concave in a paraxial region thereof, an image-side surface 242 being convex in a paraxial region thereof, and both the object-side surface 241 and the image-side surface 242 being aspheric. The fourth lens element 240 is made of plastic material.

The fifth lens element 250 with positive refractive power has an object-side surface 251 being convex in a paraxial region thereof, an image-side surface 252 being concave in a paraxial region thereof, both the object-side surface 251 and the image-side surface 252 being aspheric, and at least one critical point in both an off-axis region of the object-side surface 251 and an off-axis region of the image-side surface 252 thereof. The fifth lens element 250 is made of plastic material.

The sixth lens element 260 with negative refractive power has an object-side surface 261 being convex in a paraxial region thereof, an image-side surface 262 being concave in a paraxial region thereof, both the object-side surface 261 and the image-side surface 262 being aspheric, and at least one critical point in both an off-axis region of the object-side surface 261 and an off-axis region of the image-side surface 262 thereof. The sixth lens element 260 is made of plastic material.

In the imaging optical lens, three consecutive lens elements, the second lens element 220, the third lens element 230, and the fourth lens element 240, have Abbe numbers lower than 48.

The imaging optical lens further includes an aperture stop 200 disposed at an object side of the first lens element 210, a stop 201 disposed between the second lens element 220 and the third lens element 230, and a filter 270 disposed between the sixth lens element 260 and an image surface 280. The filter 270 is made of glass material and will not affect a focal length of the imaging optical lens. The image sensor 290 is disposed on or near the image surface 280 of the imaging optical lens.

The detailed optical data of the 2nd embodiment are shown in TABLE 3, and the aspheric surface data are shown in TABLE 4.

TABLE 3

(2nd Embodiment)
f = 4.08 mm, Fno = 1.77, HFOV = 40.8 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.415 | | | | |
| 2 | Lens 1 | 1.730 | ASP | 0.573 | Plastic | 1.545 | 56.1 | 4.04 |
| 3 | | 7.153 | ASP | 0.198 | | | | |
| 4 | Lens 2 | 3.225 | ASP | 0.135 | Plastic | 1.688 | 18.7 | −8.54 |
| 5 | | 2.046 | ASP | 0.280 | | | | |
| 6 | Stop | Planar | | 0.066 | | | | |
| 7 | Lens 3 | 7.513 | ASP | 0.596 | Plastic | 1.529 | 45.4 | 13.69 |
| 8 | | −199.601 | ASP | 0.335 | | | | |
| 9 | Lens 4 | −19.862 | ASP | 0.140 | Plastic | 1.566 | 37.4 | −39.12 |
| 10 | | −193.037 | ASP | 0.189 | | | | |
| 11 | Lens 5 | 1.903 | ASP | 0.490 | Plastic | 1.544 | 56.0 | 10.92 |
| 12 | | 2.546 | ASP | 0.420 | | | | |
| 13 | Lens 6 | 4.094 | ASP | 0.767 | Plastic | 1.544 | 56.0 | −5.75 |
| 14 | | 1.656 | ASP | 0.400 | | | | |
| 15 | Filter | Planar | | 0.145 | Glass | 1.517 | 64.2 | — |
| 16 | | Planar | | 0.217 | | | | |
| 17 | Image Surface | Planar | | — | | | | |

\* Reference wavelength is d-line 587.6 nm.
\* The effective radius of Surface 6 is 1.060 mm.
\* The effective radius of Surface 14 is 2.900 mm.

TABLE 4

Aspheric Coefficients

| Surface # | 2 | 3 | 4 | 5 |
|---|---|---|---|---|
| k = | −4.1289E−01 | −8.2312E+01 | −7.8468E+01 | −2.3046E+01 |
| A4 = | 1.0117E−02 | −4.1720E−02 | −1.2181E−01 | −2.8434E−02 |
| A6 = | −1.4461E−02 | 5.5226E−02 | 9.0095E−02 | 3.8909E−02 |
| A8 = | 5.7579E−02 | −3.7614E−02 | 2.3039E−01 | 2.7941E−01 |

TABLE 4-continued

Aspheric Coefficients

| A10 = | −9.4098E−02 | 2.2982E−03 | −4.2143E−01 | −4.5170E−01 |
| A12 = | 7.2201E−02 | 8.7352E−03 | 2.6948E−01 | 2.8626E−01 |
| A14 = | −2.2862E−02 | −5.4052E−03 | −6.1058E−02 | −6.3337E−02 |

| Surface # | 7 | 8 | 9 | 10 |
|---|---|---|---|---|
| k = | −3.1753E+01 | 9.0000E+01 | −9.0000E+01 | 9.0000E+01 |
| A4 = | −5.4794E−02 | −4.4218E−02 | −2.3614E−02 | −1.4331E−01 |
| A6 = | −5.9852E−03 | 1.0526E−02 | 6.1426E−02 | 1.2131E−01 |
| A8 = | 2.8598E−02 | −7.7014E−02 | −9.9066E−02 | −8.6578E−02 |
| A10 = | −5.3350E−02 | 9.8358E−02 | 6.9269E−02 | 4.2360E−02 |
| A12 = | 4.0270E−02 | −8.1049E−02 | −2.6055E−02 | −1.0357E−02 |
| A14 = | −1.7809E−02 | 3.3904E−02 | 3.2219E−03 | 9.5998E−04 |
| A16 = | | −6.1479E−03 | | |

| Surface # | 11 | 12 | 13 | 14 |
|---|---|---|---|---|
| k = | −4.6419E+00 | −1.5896E+01 | −2.0686E+00 | −1.2048E+00 |
| A4 = | −4.9097E−02 | 5.2128E−02 | −2.7884E−01 | −2.4670E−01 |
| A6 = | −3.5407E−02 | −6.9587E−02 | 1.7102E−01 | 1.4878E−01 |
| A8 = | 2.8544E−02 | 2.4792E−02 | −8.2266E−02 | −6.6659E−02 |
| A10 = | −3.0312E−02 | −6.2203E−03 | 3.0192E−02 | 1.8891E−02 |
| A12 = | 1.4868E−02 | 1.2618E−03 | −7.5325E−03 | −3.2273E−03 |
| A14 = | −2.9672E−03 | −1.5276E−04 | 1.2330E−03 | 3.1550E−04 |
| A16 = | 2.0637E−04 | 7.1592E−06 | −1.2887E−04 | −1.5258E−05 |
| A18 = | | | 7.9239E−06 | 1.7675E−07 |
| A20 = | | | −2.2063E−07 | 7.1255E−09 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | |
|---|---|
| f [mm] | 4.08 |
| Fno | 1.77 |
| HFOV [deg.] | 40.8 |
| Nmax | 1.688 |
| V3 + V4 | 82.8 |
| \|V3 − V4\| | 7.9 |
| ATmax/ATmin | 2.22 |
| CT2/T12 | 0.68 |
| T12/T56 | 0.47 |
| T23/T56 | 0.82 |
| T34/T12 | 1.69 |
| T34/T56 | 0.80 |
| T45/T56 | 0.45 |
| f/\|R5\| + f/\|R6\| | 0.56 |
| f/[R7] + f/[R8] | 0.23 |
| f/R9 | 2.15 |
| f/R10 | 1.60 |
| \|f1/f6\| | 0.70 |
| f34/f | 5.02 |
| f45/f | 3.77 |
| f5/f | 2.68 |
| TL/EPD | 2.15 |
| TL/ImgH | 1.40 |

3rd Embodiment

Figure 3A:
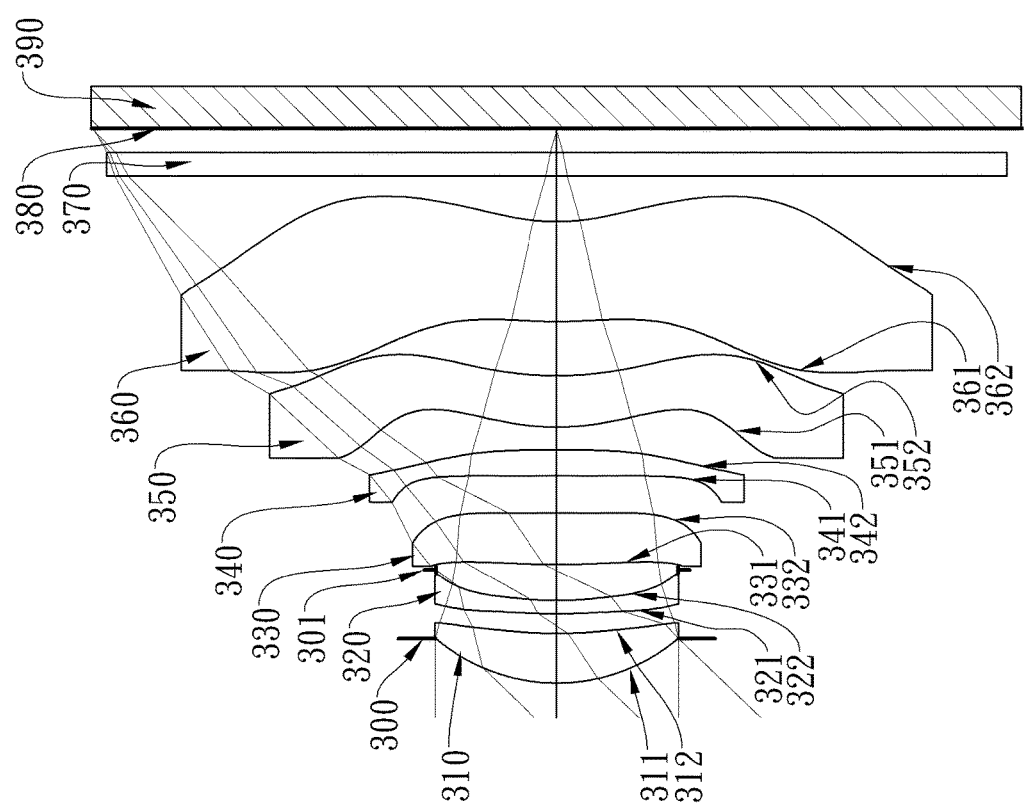
FIG. 3A is a schematic view of an imaging apparatus according to the 3rd embodiment of the present disclosure.
Figure 3B:
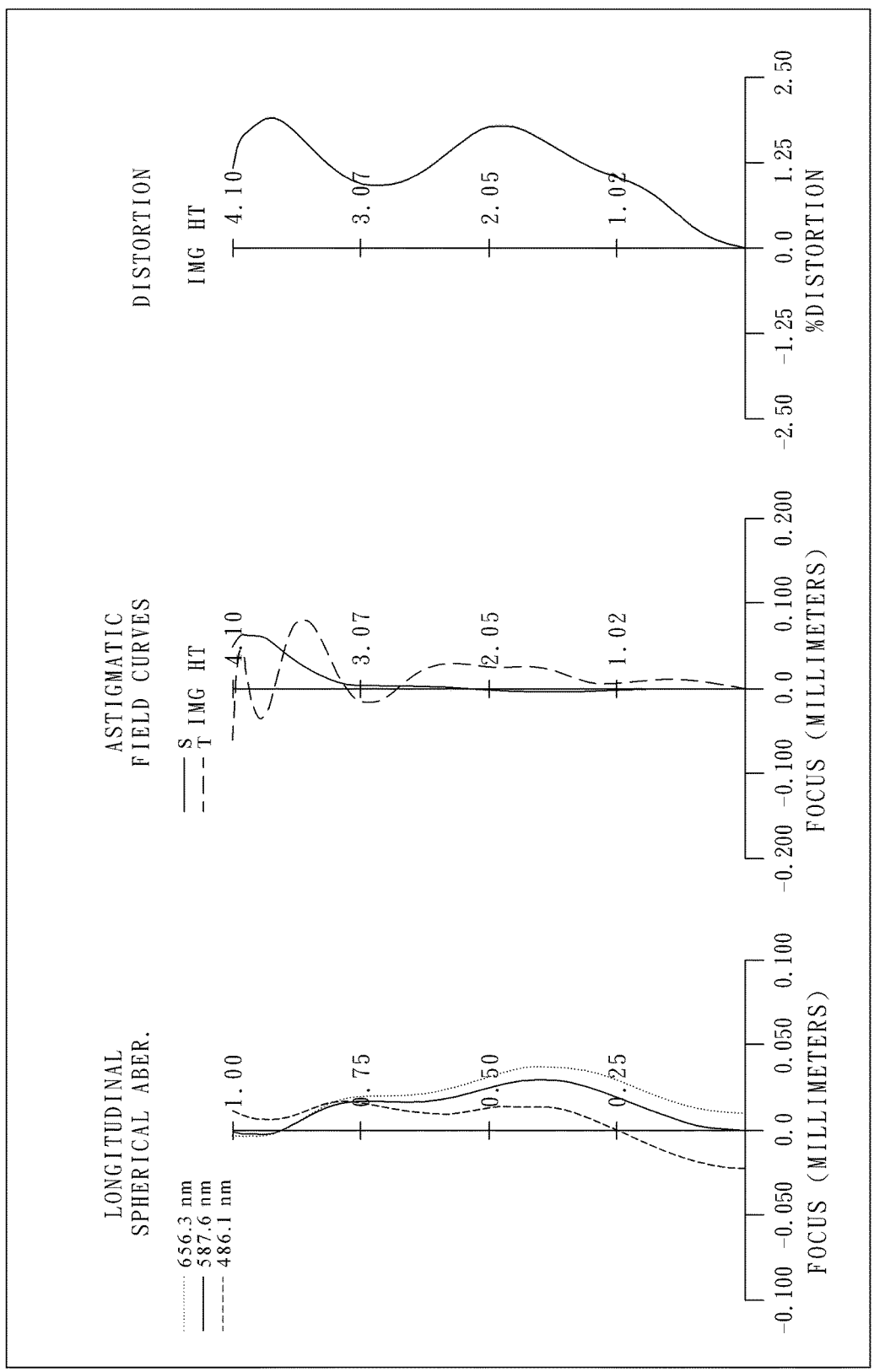
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an imaging optical lens (not otherwise herein labeled) of the present disclosure and an image sensor 390. The imaging optical lens includes six lens elements, the six lens elements being, in order from an object side to an image side, a first lens element 310, a second lens element 320, a third lens element 330, a fourth lens element 340, a fifth lens element 350, and a sixth lens element 360 and no other lens elements are inserted between the first lens element 310 and the sixth lens element 360.

The first lens element 310 with positive refractive power has an object-side surface 311 being convex in a paraxial region thereof, an image-side surface 312 being concave in a paraxial region thereof, and both the object-side surface 311 and the image-side surface 312 being aspheric. The first lens element 310 is made of plastic material.

The second lens element 320 with negative refractive power has an object-side surface 321 being convex in a paraxial region thereof, an image-side surface 322 being concave in a paraxial region thereof, and both the object-side surface 321 and the image-side surface 322 being aspheric. The second lens element 320 is made of plastic material.

The third lens element 330 with positive refractive power has an object-side surface 331 being convex in a paraxial region thereof, an image-side surface 332 being concave in a paraxial region thereof, and both the object-side surface 331 and the image-side surface 332 being aspheric. The third lens element 330 is made of plastic material.

The fourth lens element 340 with positive refractive power has an object-side surface 341 being convex in a paraxial region thereof, an image-side surface 342 being convex in a paraxial region thereof, and both the object-side surface 341 and the image-side surface 342 being aspheric. The fourth lens element 340 is made of plastic material.

The fifth lens element 350 with positive refractive power has an object-side surface 351 being convex in a paraxial region thereof, an image-side surface 352 being concave in a paraxial region thereof, both the object-side surface 351 and the image-side surface 352 being aspheric, and at least one critical point in both an off-axis region of the object-side surface 351 and an off-axis region of the image-side surface 352 thereof. The fifth lens element 350 is made of plastic material.

The sixth lens element 360 with negative refractive power has an object-side surface 361 being convex in a paraxial region thereof, an image-side surface 362 being concave in a paraxial region thereof, both the object-side surface 361 and the image-side surface 362 being aspheric, and at least one critical point in both an off-axis region of the object-side surface 361 and an off-axis region of the image-side surface 362 thereof. The sixth lens element 360 is made of plastic material.

In the imaging optical lens, each of the first lens element 310, the second lens element 320, the third lens element 330, the fifth lens element 350 and the sixth lens element 360 has both a curvature radius of the object-side surface and a curvature radius of the image-side surface thereof being positive.

The imaging optical lens further includes an aperture stop 300 disposed at an object side of the first lens element 310, a stop 301 disposed between the second lens element 320 and the third lens element 330, and a filter 370 disposed between the sixth lens element 360 and an image surface 380. The filter 370 is made of glass material and will not affect the focal length of the imaging optical lens. The image sensor 390 is disposed on or near the image surface 380 of the imaging optical lens.

The detailed optical data of the 3rd embodiment are shown in TABLE 5, and the aspheric surface data are shown in TABLE 6.

ing values for the 3rd embodiment, so an explanation in this regard will not be provided again.

Moreover, these parameters can be calculated from TABLE 5 and TABLE 6 and satisfy the conditions stated in table below.

TABLE 5

(3rd Embodiment)
f = 3.89 mm, Fno = 1.81, HFOV = 46.1 deg.

| Surface # |  | Curvature Radius |  | Thickness | Material | Index | Abbe # | Focal Length |
|---|---|---|---|---|---|---|---|---|
| 0 | Object | Planar |  | Infinity |  |  |  |  |
| 1 | Ape. Stop | Planar |  | −0.392 |  |  |  |  |
| 2 | Lens 1 | 1.666 | ASP | 0.438 | Plastic | 1.545 | 56.1 | 4.99 |
| 3 |  | 3.907 | ASP | 0.172 |  |  |  |  |
| 4 | Lens 2 | 4.112 | ASP | 0.120 | Plastic | 1.688 | 18.7 | −15.80 |
| 5 |  | 2.948 | ASP | 0.273 |  |  |  |  |
| 6 | Stop | Planar |  | 0.046 |  |  |  |  |
| 7 | Lens 3 | 6.458 | ASP | 0.454 | Plastic | 1.544 | 56.0 | 17.67 |
| 8 |  | 19.193 | ASP | 0.332 |  |  |  |  |
| 9 | Lens 4 | 114.483 | ASP | 0.226 | Plastic | 1.544 | 56.0 | 88.39 |
| 10 |  | −82.856 | ASP | 0.202 |  |  |  |  |
| 11 | Lens 5 | 2.154 | ASP | 0.455 | Plastic | 1.544 | 56.0 | 10.72 |
| 12 |  | 3.162 | ASP | 0.478 |  |  |  |  |
| 13 | Lens 6 | 4.378 | ASP | 0.886 | Plastic | 1.544 | 56.0 | −6.19 |
| 14 |  | 1.768 | ASP | 0.400 |  |  |  |  |
| 15 | Filter | Planar |  | 0.210 | Glass | 1.517 | 64.2 | — |
| 16 |  | Planar |  | 0.212 |  |  |  |  |
| 17 | Image Surface | Planar |  | — |  |  |  |  |

* Reference wavelength is d-line 587.6 nm.
* The effective radius of Surface 6 is 1.070 mm.

TABLE 6

Aspheric Coefficients

| Surface # | 2 | 3 | 4 | 5 |
|---|---|---|---|---|
| k = | −2.4160E−01 | −4.3880E+01 | −5.0337E+01 | −3.0610E+01 |
| A4 = | 1.0674E−02 | 2.2318E−02 | −1.6383E−01 | −4.7562E−02 |
| A6 = | −2.3107E−02 | −7.2272E−02 | 1.6257E−01 | 1.8824E−02 |
| A8 = | 1.0267E−01 | 1.1024E−01 | 2.0286E−01 | 5.3088E−01 |
| A10 = | −1.7554E−01 | −8.9973E−02 | −4.2248E−01 | −8.5001E−01 |
| A12 = | 1.4498E−01 | 4.4676E−02 | 2.7452E−01 | 5.8251E−01 |
| A14 = | −4.7279E−02 | −1.4097E−02 | −6.4758E−02 | −1.5118E−01 |

| Surface # | 7 | 8 | 9 | 10 |
|---|---|---|---|---|
| k = | −1.8200E+01 | 4.2689E+01 | −9.0000E+01 | 8.6320E+01 |
| A4 = | −7.2001E−02 | −5.2004E−02 | −3.2239E−02 | −1.2179E−01 |
| A6 = | 1.0902E−01 | 3.2788E−02 | 5.7920E−02 | 6.4004E−02 |
| A8 = | −2.8330E−01 | −1.1737E−01 | −7.0083E−02 | −2.0816E−02 |
| A10 = | 3.9372E−01 | 1.2866E−01 | 4.5896E−02 | 1.1023E−02 |
| A12 = | −2.8354E−01 | −9.1942E−02 | −1.7773E−02 | −4.5004E−03 |
| A14 = | 7.7961E−02 | 3.4866E−02 | 2.1293E−03 | 6.6607E−04 |
| A16 = |  | −6.2017E−03 |  |  |

| Surface # | 11 | 12 | 13 | 14 |
|---|---|---|---|---|
| k = | −5.1729E+00 | −1.0100E+01 | −2.2334E+00 | −1.1788E+00 |
| A4 = | 1.3909E−03 | 5.2532E−02 | −1.8542E−01 | −1.4965E−01 |
| A6 = | −7.0758E−02 | −6.3139E−02 | 6.2674E−02 | 5.4354E−02 |
| A8 = | 4.2303E−02 | 2.2072E−02 | −1.1375E−02 | −1.3786E−02 |
| A10 = | −2.2623E−02 | −4.2150E−03 | 1.4612E−03 | 2.0997E−03 |
| A12 = | 6.5562E−03 | 4.4824E−04 | −1.4463E−04 | −1.8417E−04 |
| A14 = | −6.6672E−04 | −2.0230E−05 | 9.4921E−06 | 8.6764E−06 |
| A16 = |  |  | −2.8372E−07 | −1.7143E−07 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with correspond-

| 3rd Embodiment | | | |
|---|---|---|---|
| f [mm] | 3.89 | T45/T56 | 0.42 |
| Fno | 1.81 | f/|R5| + f/|R6| | 0.81 |
| HFOV [deg.] | 46.1 | f/|R7| + f/|R8| | 0.08 |
| Nmax | 1.688 | f/R9 | 1.81 |
| V3 + V4 | 112.0 | f/R10 | 1.23 |
| |V3 − V4| | 0.0 | |f1/f6| | 0.81 |
| ATmax/ATmin | 2.78 | f34/f | 3.81 |
| CT2/T12 | 0.70 | f45/f | 2.45 |
| T12/T56 | 0.36 | f5/f | 2.75 |
| T23/T56 | 0.67 | TL/EPD | 2.28 |
| T34/T12 | 1.93 | TL/ImgH | 1.20 |
| T34/T56 | 0.69 | | |

4th Embodiment

Figure 4A:
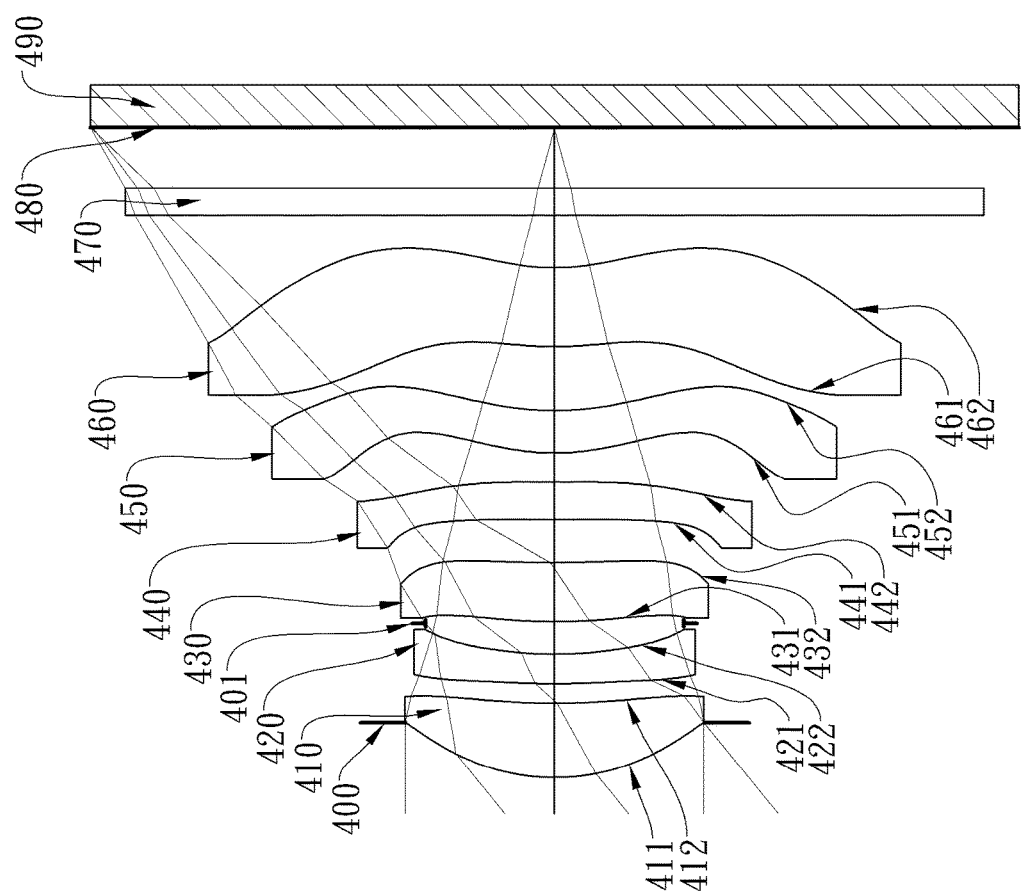
FIG. 4A is a schematic view of an imaging apparatus according to the 4th embodiment of the present disclosure.
Figure 4B:
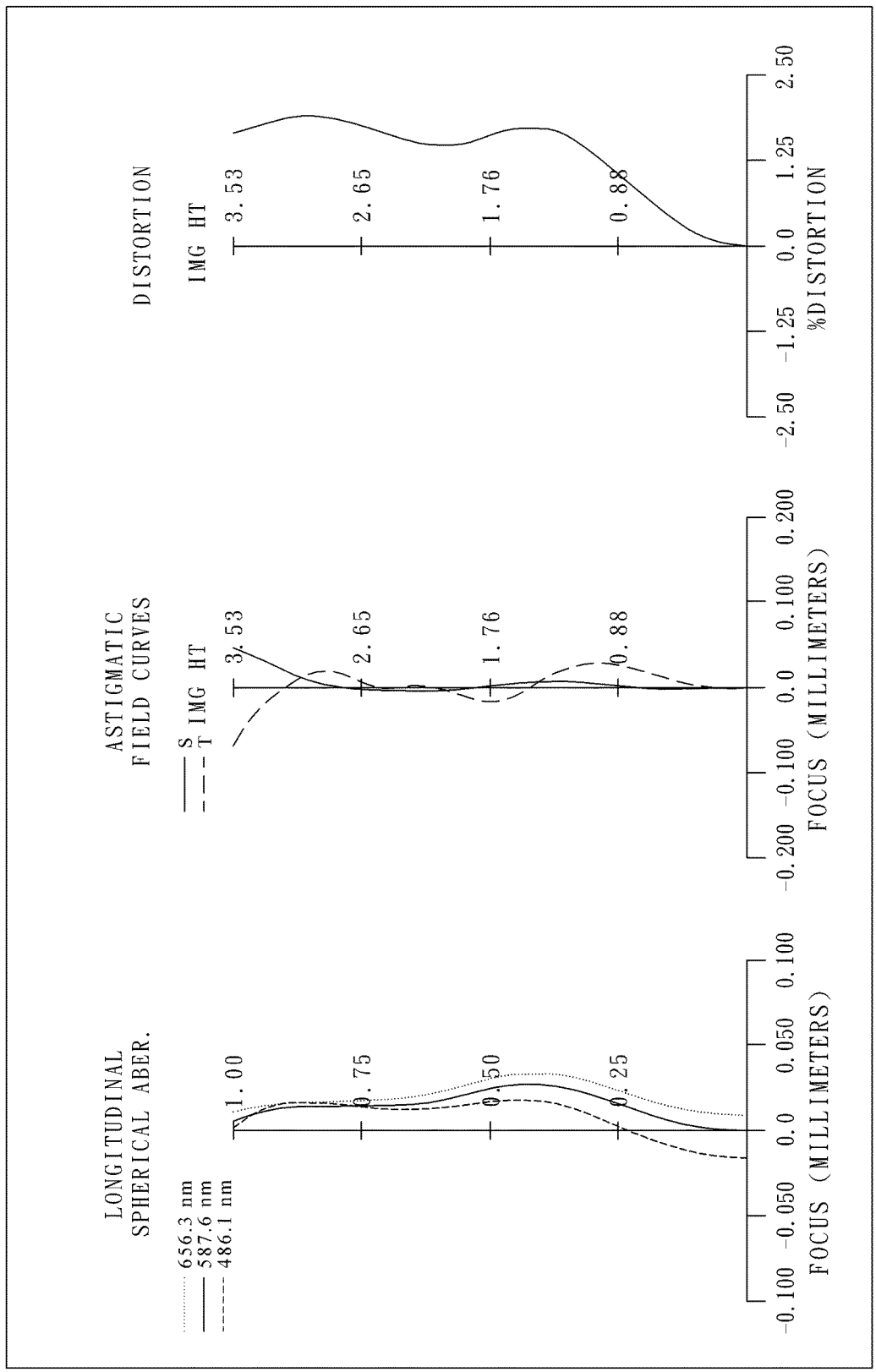
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an imaging optical lens (not otherwise herein labeled) of the present disclosure and an image sensor 490. The imaging optical lens includes six lens elements, the six lens elements being, in order from an object side to an image side, a first lens element 410 a second lens element 420, a third lens element 430, a fourth lens element 440, a fifth lens element 450, and a sixth lens element 460 and no other lens elements are inserted between the first lens element 410 and the sixth lens element 460.

The first lens element 410 with positive refractive power has an object-side surface 411 being convex in a paraxial region thereof, an image-side surface 412 being concave in a paraxial region thereof, and both the object-side surface 411 and the image-side surface 412 being aspheric. The first lens element 410 is made of plastic material.

The second lens element 420 with negative refractive power has an object-side surface 421 being convex in a paraxial region thereof, an image-side surface 422 being concave in a paraxial region thereof, and both the object-side surface 421 and the image-side surface 422 being aspheric. The second lens element 420 is made of plastic material.

The third lens element 430 with positive refractive power has an object-side surface 431 being convex in a paraxial region thereof, and an image-side surface 432 being concave in a paraxial region thereof, and both the object-side surface 431 and the image-side surface 432 being aspheric. The third lens element 430 is made of plastic material.

The fourth lens element 440 with negative refractive power has an object-side surface 441 being convex in a paraxial region thereof, an image-side surface 442 being concave in a paraxial region thereof, and both the object-side surface 441 and the image-side surface 442 being aspheric. The fourth lens element 440 is made of plastic material.

The fifth lens element 450 with positive refractive power has an object-side surface 451 being convex in a paraxial region thereof, an image-side surface 452 being concave in a paraxial region thereof, both the object-side surface 451 and the image-side surface 452 being aspheric, and at least one critical point in both an off-axis region of the object-side surface 451 and an off-axis region of the image-side surface 452 thereof. The fifth lens element 450 is made of plastic material.

The sixth lens element 460 with negative refractive power has an object-side surface 461 being convex in a paraxial region thereof, an image-side surface 462 being concave in a paraxial region thereof, both the object-side surface 461 and the image-side surface 462 being aspheric, and at least one critical point in both an off-axis region of the object-side surface 461 and an off-axis region of the image-side surface 462 thereof. The sixth lens element 460 is made of plastic material.

In the imaging optical lens, each of the first lens element 410, the second lens element 420, the third lens element 430, the fourth lens element 440, the fifth lens element 450 and the sixth lens element 460 has both a curvature radius of the object-side surface and a curvature radius of the image-side surface thereof being positive. Three consecutive lens elements, the second lens element 420, the third lens element 430, and the fourth lens element 440, have Abbe numbers lower than 48.

The imaging optical lens further includes an aperture stop 400 disposed at an object side of the first lens element 410, a stop 401 disposed between the second lens element 420 and the third lens element 430, and a filter 470 disposed between the sixth lens element 460 and an image surface 480. The filter 470 is made of glass material and will not affect a focal length of the imaging optical lens. The image sensor 490 is disposed on or near the image surface 480 of the imaging optical lens.

The detailed optical data of the 4th embodiment are shown in TABLE 7, and the aspheric surface data are shown in TABLE 8.

TABLE 7

(4th Embodiment)
f = 4.27 mm, Fno = 1.87, HFOV = 39.0 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.420 | | | | |
| 2 | Lens 1 | 1.650 | ASP | 0.569 | Plastic | 1.545 | 56.1 | 4.39 |
| 3 | | 4.662 | ASP | 0.149 | | | | |
| 4 | Lens 2 | 5.107 | ASP | 0.225 | Plastic | 1.669 | 19.5 | −8.50 |
| 5 | | 2.643 | ASP | 0.237 | | | | |
| 6 | Stop | Planar | | 0.012 | | | | |
| 7 | Lens 3 | 3.855 | ASP | 0.450 | Plastic | 1.561 | 43.1 | 12.90 |
| 8 | | 7.908 | ASP | 0.330 | | | | |
| 9 | Lens 4 | 65.338 | ASP | 0.285 | Plastic | 1.566 | 37.4 | −142.68 |
| 10 | | 36.062 | ASP | 0.227 | | | | |
| 11 | Lens 5 | 1.783 | ASP | 0.323 | Plastic | 1.544 | 56.0 | 14.58 |
| 12 | | 2.154 | ASP | 0.490 | | | | |
| 13 | Lens 6 | 2.710 | ASP | 0.601 | Plastic | 1.534 | 55.9 | −8.95 |
| 14 | | 1.596 | ASP | 0.400 | | | | |
| 15 | Filter | Planar | | 0.210 | Glass | 1.517 | 64.2 | — |
| 16 | | Planar | | 0.466 | | | | |
| 17 | Image Surface | Planar | | — | | | | |

* Reference wavelength is d-line 587.6 nm.
* The effective radius of Surface 6 is 0.985 mm.

TABLE 8

Aspheric Coefficients

| | Surface # | | | |
|---|---|---|---|---|
| | 2 | 3 | 4 | 5 |
| k = | −3.6106E−01 | −7.5224E+01 | −5.8051E+01 | −2.3131E+01 |
| A4 = | 4.8622E−03 | 4.7220E−03 | −1.5057E−01 | −1.9141E−02 |
| A6 = | 4.2955E−03 | −2.6046E−02 | 3.1432E−01 | 1.7042E−01 |
| A8 = | 7.2841E−03 | 1.4864E−02 | −4.0287E−01 | −2.0450E−01 |
| A10 = | −3.0213E−02 | 6.1832E−03 | 4.0234E−01 | 2.4970E−01 |
| A12 = | 3.0422E−02 | −1.6588E−02 | −2.4144E−01 | −1.7737E−01 |
| A14 = | −1.2948E−02 | 4.5039E−03 | 6.2869E−02 | 5.4127E−02 |

| | Surface # | | | |
|---|---|---|---|---|
| | 7 | 8 | 9 | 10 |
| k = | −1.7222E+01 | −2.2725E+01 | −9.0000E+01 | −9.0000E+01 |
| A4 = | −4.9171E−02 | −3.2548E−02 | −7.3601E−02 | −1.6879E−01 |
| A6 = | −2.0687E−02 | −1.2581E−01 | 9.4426E−02 | 1.4170E−01 |

TABLE 8-continued

| Aspheric Coefficients | | | | |
|---|---|---|---|---|
| A8 = | 8.6339E-02 | 3.2626E-01 | -1.2236E-01 | -8.1682E-02 |
| A10 = | -2.1353E-01 | -5.9062E-01 | 9.7828E-02 | 3.6565E-02 |
| A12 = | 2.0318E-01 | 5.3810E-01 | -5.7743E-02 | -1.0053E-02 |
| A14 = | -8.0373E-02 | -2.5389E-01 | 1.2202E-02 | 1.2110E-03 |
| A16 = | | 4.7644E-02 | | |

| | Surface # | | | |
|---|---|---|---|---|
| | 11 | 12 | 13 | 14 |
| k = | -5.0651E+00 | -1.5612E+01 | -2.7861E+00 | -1.1477E+00 |
| A4 = | -4.9883E-02 | 7.1788E-02 | -2.7397E-01 | -2.4769E-01 |
| A6 = | 7.0519E-03 | -8.6973E-02 | 1.0805E-01 | 1.2138E-01 |
| A8 = | -3.3722E-02 | 2.7081E-02 | -1.9648E-02 | -4.7609E-02 |
| A10 = | 1.0021E-02 | -3.7295E-03 | 1.6632E-03 | 1.2388E-02 |
| A12 = | 8.6109E-04 | 2.6033E-04 | -2.7712E-03 | -1.9251E-03 |
| A14 = | -3.6090E-04 | -1.1779E-05 | -3.7335E-06 | 1.6039E-04 |
| A16 = | | | 9.7017E-08 | -5.4777E-06 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 4.27 | T45/T56 | 0.46 |
| Fno | 1.87 | f/|R5| + f/|R6| | 1.65 |
| HFOV [deg.] | 39.0 | f/|R7| + f/|R8| | 0.18 |
| Nmax | 1.669 | f/R9 | 2.39 |
| V3 + V4 | 80.5 | f/R10 | 1.98 |
| |V3 − V4| | 5.6 | |f1/f6| | 0.49 |
| ATmax/ATmin | 3.29 | f34/f | 3.29 |
| CT2/T12 | 1.51 | f45/f | 3.83 |
| T12/T56 | 0.30 | f5/f | 3.42 |
| T23/T56 | 0.51 | TL/EPD | 2.18 |
| T34/T12 | 2.21 | TL/ImgH | 1.41 |
| T34/T56 | 0.67 | | |

5th Embodiment

Figure 5A:
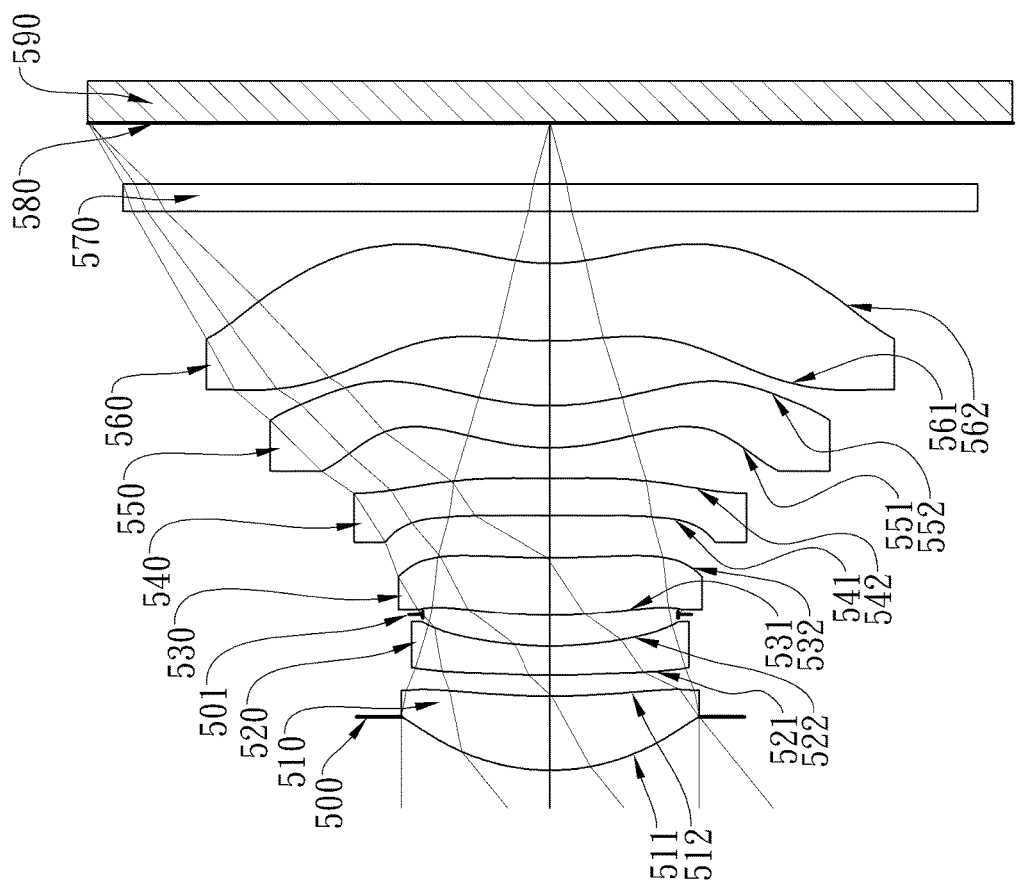
FIG. 5A is a schematic view of an imaging apparatus according to the 5th embodiment of the present disclosure.
Figure 5B:
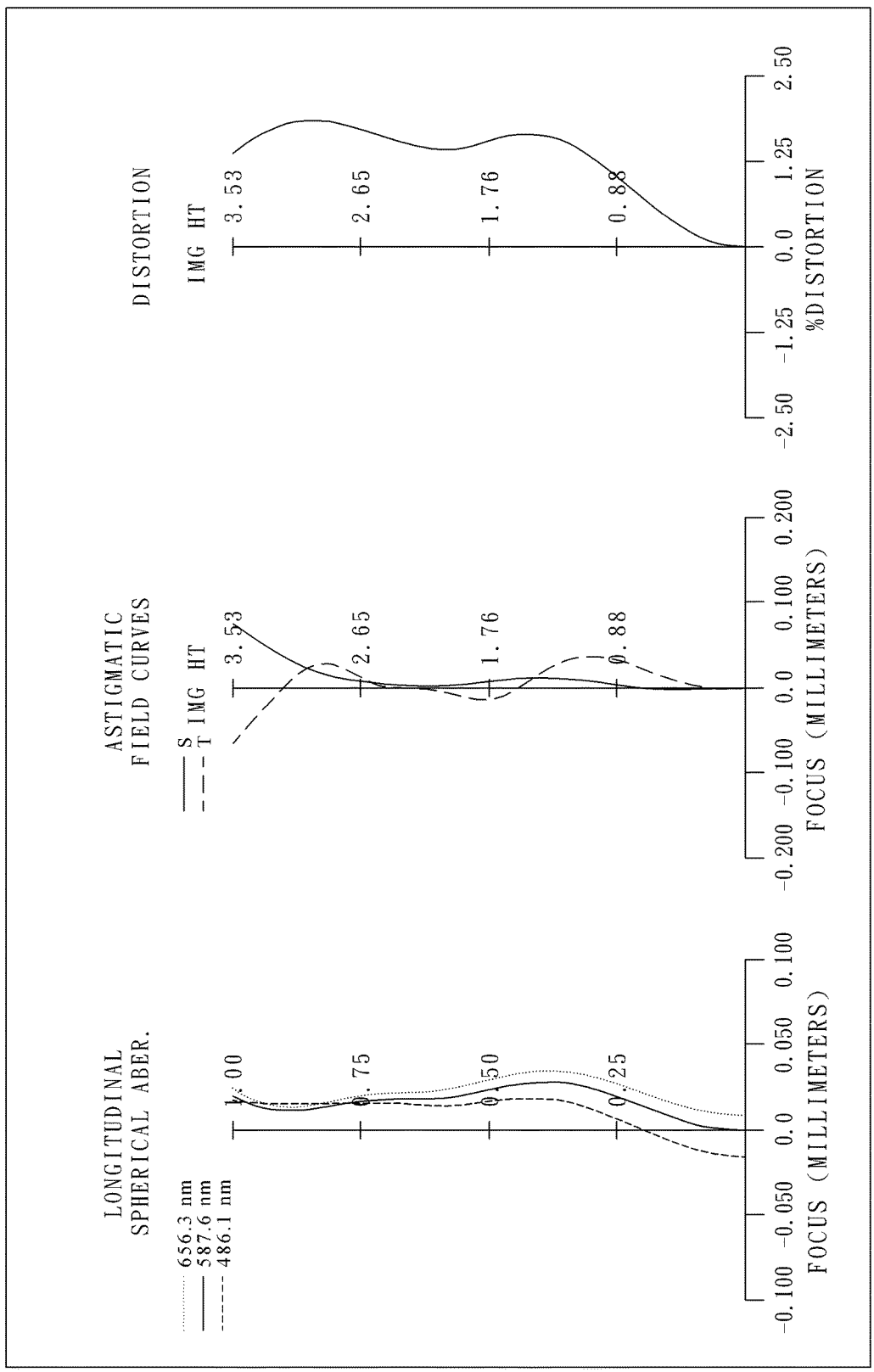
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an imaging optical lens (not otherwise herein labeled) of the present disclosure and an image sensor 590. The imaging optical lens includes six lens elements, the six lens elements being, in order from an object side to an image side, a first lens element 510, a second lens element 520, a third lens element 530, a fourth lens element 540, a fifth lens element 550, and a sixth lens element 560 and no other lens elements are inserted between the first lens element 510 and the sixth lens element 560.

The first lens element 510 with positive refractive power has an object-side surface 511 being convex in a paraxial region thereof, an image-side surface 512 being concave in a paraxial region thereof, and both the object-side surface 511 and the image-side surface 512 being aspheric. The first lens element 510 is made of plastic material.

The second lens element 520 with negative refractive power has an object-side surface 521 being convex in a paraxial region thereof, an image-side surface 522 being concave in a paraxial region thereof, and both the object-side surface 521 and the image-side surface 522 being aspheric. The second lens element 520 is made of plastic material.

The third lens element 530 with positive refractive power has an object-side surface 531 being convex in a paraxial region thereof, an image-side surface 532 being concave in a paraxial region thereof, and both the object-side surface 531 and the image-side surface 532 being aspheric. The third lens element 530 is made of plastic material.

The fourth lens element 540 with negative refractive power has an object-side surface 541 being convex in a paraxial region thereof, an image-side surface 542 being concave in a paraxial region thereof, and both the object-side surface 541 and the image-side surface 542 being aspheric. The fourth lens element 540 is made of plastic material.

The fifth lens element 550 with positive refractive power has an object-side surface 551 being convex in a paraxial region thereof, an image-side surface 552 being concave in a paraxial region thereof, both the object-side surface 551 and the image-side surface 552 being aspheric, and at least one critical point in both an off-axis region of the object-side surface 551 and an off-axis region of the image-side surface 552 thereof. The fifth lens element 550 is made of plastic material.

The sixth lens element 560 with negative refractive power has an object-side surface 561 being convex in a paraxial region thereof, an image-side surface 562 being concave in a paraxial region thereof, both the object-side surface 561 and the image-side surface 562 being aspheric, and at least one critical point in both an off-axis region of the object-side surface 561 and an off-axis region of the image-side surface 562 thereof. The sixth lens element 560 is made of plastic material.

In the imaging optical lens, each of the first lens element 510, the second lens element 520, the third lens element 530, the fourth lens element 540, the fifth lens element 550 and the sixth lens element 560 has both a curvature radius of the object-side surface and a curvature radius of the image-side surface thereof being positive. Three consecutive lens elements, the second lens element 520, the third lens element 530, and the fourth lens element 540, have Abbe numbers lower than 48.

The imaging optical lens further includes an aperture stop 500 disposed at an object side of the first lens element 510, a stop 501 disposed between the second lens element 520 and the third lens element 530, and a filter 570 disposed between the sixth lens element 560 and an image surface 580. The filter 570 is made of glass material and will not affect the focal length of the imaging optical lens. The image sensor 590 is disposed on or near the image surface 580 of the imaging optical lens.

The detailed optical data of the 5th embodiment are shown in TABLE 9, and the aspheric surface data are shown in TABLE 10.

TABLE 9

(5th Embodiment)
f = 4.28 mm, Fno = 1.87, HFOV = 39.0 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.410 | | | | |
| 2 | Lens 1 | 1.660 | ASP | 0.568 | Plastic | 1.545 | 56.1 | 4.40 |
| 3 | | 4.743 | ASP | 0.161 | | | | |
| 4 | Lens 2 | 4.913 | ASP | 0.225 | Plastic | 1.669 | 19.5 | −7.65 |
| 5 | | 2.460 | ASP | 0.242 | | | | |
| 6 | Stop | Planar | | −0.004 | | | | |
| 7 | Lens 3 | 3.471 | ASP | 0.443 | Plastic | 1.566 | 37.4 | 10.68 |
| 8 | | 7.780 | ASP | 0.324 | | | | |
| 9 | Lens 4 | 33.568 | ASP | 0.285 | Plastic | 1.566 | 37.4 | −93.01 |
| 10 | | 20.436 | ASP | 0.235 | | | | |
| 11 | Lens 5 | 1.760 | ASP | 0.323 | Plastic | 1.544 | 56.0 | 14.75 |
| 12 | | 2.109 | ASP | 0.497 | | | | |
| 13 | Lens 6 | 2.745 | ASP | 0.600 | Plastic | 1.534 | 55.9 | −8.97 |
| 14 | | 1.612 | ASP | 0.400 | | | | |
| 15 | Filter | Planar | | 0.210 | Glass | 1.517 | 64.2 | — |
| 16 | | Planar | | 0.464 | | | | |
| 17 | Image Surface | Planar | | — | | | | |

* Reference wavelength is d-line 587.6 nm.
* The effective radius of Surface 6 is 0.980 mm.

TABLE 10

Aspheric Coefficients

| Surface # | | | | |
|---|---|---|---|---|
| | 2 | 3 | 4 | 5 |
| k = | −4.1063E−01 | −7.9183E+01 | −7.3079E+01 | −2.4773E+01 |
| A4 = | −5.2487E−04 | −2.6546E−03 | −1.6266E−01 | −2.3641E−02 |
| A6 = | 2.2169E−02 | −2.9445E−02 | 3.1073E−01 | 1.4960E−01 |
| A8 = | −2.9635E−02 | 5.9545E−02 | −3.0264E−01 | −7.6998E−02 |
| A10 = | 9.6698E−03 | −6.9149E−02 | 2.0706E−01 | 5.8969E−03 |
| A12 = | 8.2342E−03 | 3.2889E−02 | −9.2150E−02 | 2.1936E−02 |
| A14 = | −8.3630E−03 | −7.4481E−03 | 2.1035E−02 | −6.5959E−03 |

| Surface # | | | | |
|---|---|---|---|---|
| | 7 | 8 | 9 | 10 |
| k = | −1.5324E+01 | −2.3087E+01 | −7.5418E+01 | 3.8308E+01 |
| A4 = | −5.6410E−02 | −3.3310E−02 | −8.0247E−02 | −1.6780E−01 |
| A6 = | 2.9688E−02 | −1.2666E−01 | 1.0329E−01 | 1.4189E−01 |
| A8 = | −6.1967E−02 | 3.3061E−01 | −1.2976E−01 | −8.1604E−02 |
| A10 = | 4.6400E−02 | −5.9436E−01 | 9.7702E−02 | 3.6586E−02 |
| A12 = | −2.6354E−02 | 5.3851E−01 | −5.4800E−02 | −1.0068E−02 |
| A14 = | 8.5148E−04 | −2.5312E−01 | 1.1266E−02 | 1.1851E−03 |
| A16 = | | 4.7721E−02 | | |

| Surface # | | | | |
|---|---|---|---|---|
| | 11 | 12 | 13 | 14 |
| k = | −4.7586E+00 | −1.5618E+01 | −2.7986E+00 | −1.1419E+00 |
| A4 = | −5.4828E−02 | 7.1997E−02 | −2.7650E−01 | −2.4759E−01 |
| A6 = | 1.2943E−02 | −8.6958E−02 | 1.1203E−01 | 1.2062E−01 |
| A8 = | −3.7469E−02 | 2.7080E−02 | −2.2231E−02 | −4.6947E−02 |
| A10 = | 1.1802E−02 | −3.7299E−03 | 2.5230E−03 | 1.2167E−02 |
| A12 = | 4.5960E−04 | 2.6028E−04 | −1.8110E−04 | −1.8902E−03 |
| A14 = | −3.3538E−04 | −1.1784E−05 | 1.0193E−05 | 1.5779E−04 |
| A16 = | | | −4.0776E−07 | −5.4059E−06 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 4.28 | T45/T56 | 0.47 |
| Fno | 1.87 | f/|R5| + f/|R6| | 1.78 |
| HFOV [deg.] | 39.0 | f/|R7| + f/|R8| | 0.34 |
| Nmax | 1.669 | f/R9 | 2.43 |
| V3 + V4 | 74.9 | f/R10 | 2.03 |
| |V3 − V4| | 0.0 | |f1/f6| | 0.49 |
| ATmax/ATmin | 3.09 | f34/f | 2.78 |
| CT2/T12 | 1.40 | f45/f | 4.14 |
| T12/T56 | 0.32 | f5/f | 3.45 |
| T23/T56 | 0.48 | TL/EPD | 2.17 |
| T34/T12 | 2.01 | TL/ImgH | 1.41 |
| T34/T56 | 0.65 | | |

6th Embodiment

Figure 6B:
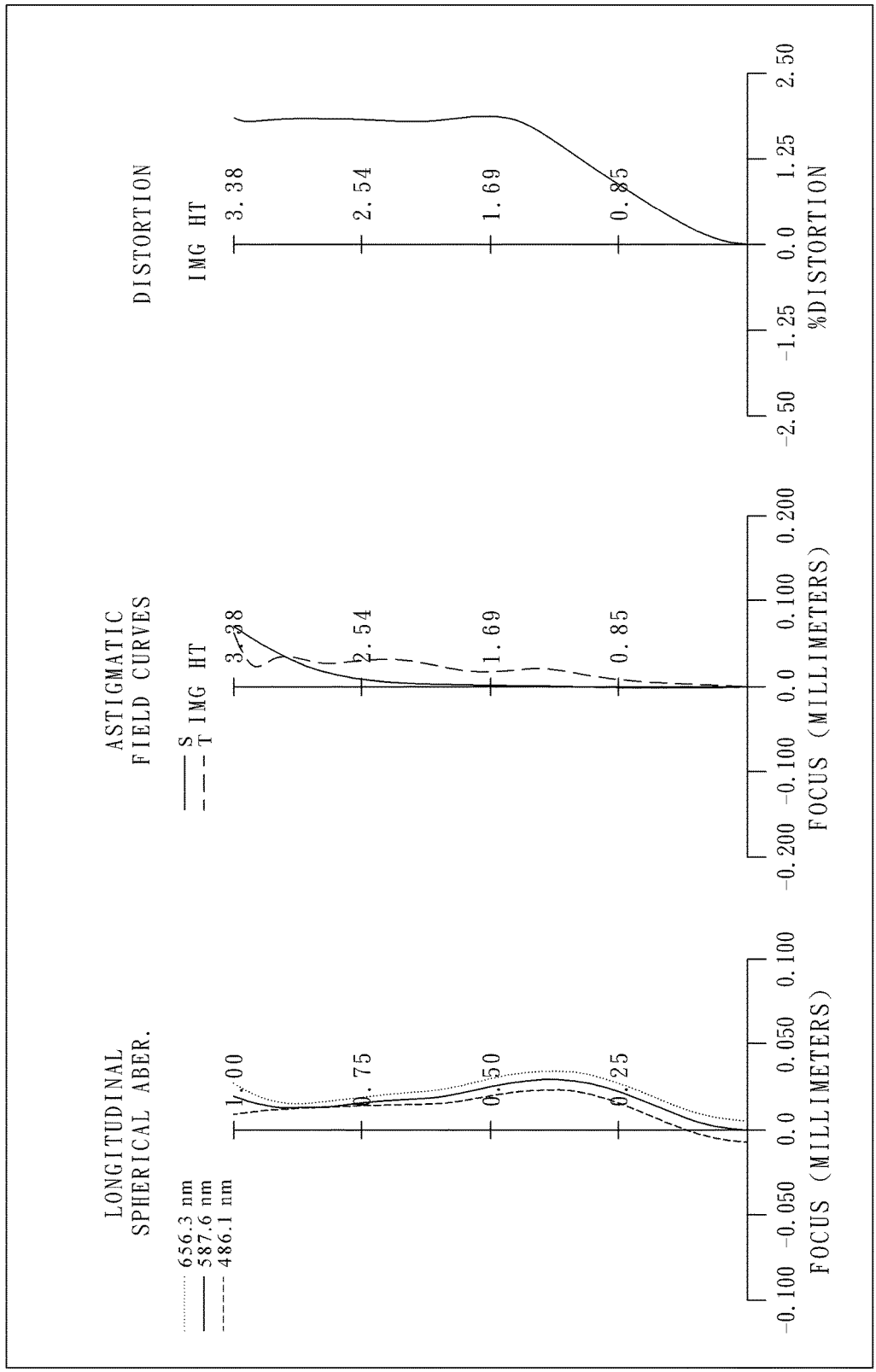
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an imaging optical lens (not otherwise herein labeled) of the present disclosure and an image sensor 690. The imaging optical lens includes six lens elements, the six lens elements being, in order from an object side to an image side, a first lens element 610, a second lens element 620, a third lens element 630, a fourth lens element 640, a fifth lens element 650, and a sixth lens element 660 and no other lens elements are inserted between the first lens element 610 and the sixth lens element 660.

The first lens element 610 with positive refractive power has an object-side surface 611 being convex in a paraxial region thereof, an image-side surface 612 being concave in a paraxial region thereof, and both the object-side surface 611 and the image-side surface 612 being aspheric. The first lens element 610 is made of glass material.

The second lens element 620 with negative refractive power has an object-side surface 621 being concave in a paraxial region thereof, an image-side surface 622 being concave in a paraxial region thereof, and both the object-side surface 621 and the image-side surface 622 being aspheric. The second lens element 620 is made of plastic material.

The third lens element 630 with positive refractive power has an object-side surface 631 being convex in a paraxial region thereof, an image-side surface 632 being concave in a paraxial region thereof, and both the object-side surface 631 and the image-side surface 632 being aspheric. The third lens element 630 is made of plastic material.

The fourth lens element 640 with positive refractive power has an object-side surface 641 being convex in a paraxial region thereof, an image-side surface 642 being concave in a paraxial region thereof, and both the object-side surface 641 and the image-side surface 642 being aspheric. The fourth lens element 640 is made of plastic material.

The fifth lens element 650 with positive refractive power has an object-side surface 651 being convex in a paraxial region thereof, an image-side surface 652 being concave in a paraxial region thereof, both the object-side surface 651 and the image-side surface 652 being aspheric, and at least one critical point in both an off-axis region of the object-side surface 651 and an off-axis region of the image-side surface 652 thereof. The fifth lens element 650 is made of plastic material.

The sixth lens element 660 with negative refractive power has an object-side surface 661 being convex in a paraxial region thereof, an image-side surface 662 being concave in a paraxial region thereof, both the object-side surface 661 and the image-side surface 662 being aspheric, and at least one critical point in both an off-axis region of the object-side surface 661 and an off-axis region of the image-side surface 662 thereof. The sixth lens element 660 is made of plastic material.

In the imaging optical lens, each of the first lens element 610, the third lens element 630, the fourth lens element 640, the fifth lens element 650 and the sixth lens element 660 has both a curvature radius of the object-side surface and a curvature radius of the image-side surface thereof being positive.

The imaging optical lens further includes an aperture stop 600 disposed at an object side of the first lens element 610, a stop 601 disposed between the second lens element 620 and the third lens element 630, and a filter 670 disposed between the sixth lens element 660 and an image surface 680. The filter 670 is made of glass material and will not affect a focal length of the imaging optical lens. The image sensor 690 is disposed on or near the image surface 680 of the imaging optical lens.

The detailed optical data of the 6th embodiment are shown in TABLE 11, and the aspheric surface data are shown in TABLE 12.

TABLE 11

(6th Embodiment)
f = 4.14 mm, Fno = 1.77, HFOV = 38.6 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.418 | | | | |
| 2 | Lens 1 | 1.689 | ASP | 0.611 | Glass | 1.566 | 61.1 | 3.77 |
| 3 | | 7.050 | ASP | 0.169 | | | | |
| 4 | Lens 2 | −107.686 | ASP | 0.182 | Plastic | 1.614 | 26.0 | −5.12 |
| 5 | | 3.236 | ASP | 0.212 | | | | |
| 6 | Stop | Planar | | −0.001 | | | | |
| 7 | Lens 3 | 2.755 | ASP | 0.506 | Plastic | 1.544 | 56.0 | 8.36 |
| 8 | | 6.537 | ASP | 0.386 | | | | |
| 9 | Lens 4 | 8.163 | ASP | 0.373 | Plastic | 1.559 | 40.4 | 415.79 |
| 10 | | 8.321 | ASP | 0.266 | | | | |
| 11 | Lens 5 | 2.133 | ASP | 0.406 | Plastic | 1.544 | 56.0 | 17.01 |
| 12 | | 2.587 | ASP | 0.404 | | | | |
| 13 | Lens 6 | 3.834 | ASP | 0.688 | Plastic | 1.511 | 56.8 | −7.27 |
| 14 | | 1.772 | ASP | 0.400 | | | | |
| 15 | Filter | Planar | | 0.080 | Glass | 1.517 | 64.2 | — |
| 16 | | Planar | | 0.271 | | | | |
| 17 | Image Surface | Planar | | — | | | | |

\* Reference wavelength is d-line 587.6 nm.
\* The effective radius of Surface 6 is 1.000 mm.

TABLE 12

Aspheric Coefficients

| | Surface # | | | |
|---|---|---|---|---|
| | 2 | 3 | 4 | 5 |
| k = | −3.7186E−01 | −8.7101E+01 | −9.0000E+01 | −2.7543E+01 |
| A4 = | 1.3286E−03 | −2.5134E−02 | −1.9409E−01 | −1.1878E−01 |
| A6 = | 2.3976E−02 | 2.0827E−02 | 5.3240E−01 | 5.2458E−01 |
| A8 = | −3.8028E−02 | −2.2574E−02 | −7.2255E−01 | −7.2750E−01 |
| A10 = | 2.2555E−02 | 4.9913E−03 | 6.1289E−01 | 6.6143E−01 |
| A12 = | −1.0032E−03 | −2.4721E−03 | −2.9615E−01 | −3.4524E−01 |
| A14 = | −5.8985E−03 | 3.5904E−06 | 6.4670E−02 | 8.3046E−02 |

| | Surface # | | | |
|---|---|---|---|---|
| | 7 | 8 | 9 | 10 |
| k = | −1.5055E+01 | −2.1338E+01 | −1.9393E+01 | −6.5024E+01 |
| A4 = | −6.0382E−02 | −5.5327E−02 | −7.1366E−02 | −1.1698E−01 |
| A6 = | 4.8097E−02 | −2.1032E−02 | 6.9074E−02 | 7.4366E−02 |
| A8 = | −4.1387E−02 | 1.2221E−02 | −8.6517E−02 | −3.1736E−02 |
| A10 = | −5.7629E−02 | −3.3684E−02 | 5.6829E−02 | 1.0485E−02 |
| A12 = | 9.5983E−02 | 1.2697E−02 | −2.4351E−02 | −2.6571E−03 |
| A14 = | −4.8283E−02 | 2.3926E−03 | 2.7971E−03 | 3.3353E−04 |
| A16 = | | −3.0452E−03 | | |

TABLE 12-continued

Aspheric Coefficients

| Surface # | | | |
|---|---|---|---|
| 11 | 12 | 13 | 14 |
| k = −4.4536E+00 | −1.2134E+01 | −8.2286E−01 | −1.1571E+00 |
| A4 = −3.0587E−02 | 3.9216E−02 | −2.4207E−01 | −2.0941E−01 |
| A6 = −5.0205E−02 | −5.4616E−02 | 1.0824E−01 | 1.0152E−01 |
| A8 = 2.9771E−02 | 1.9116E−02 | −2.3700E−02 | −3.8319E−02 |
| A10 = −1.7557E−02 | −3.3296E−03 | 2.6383E−03 | 9.2202E−03 |
| A12 = 5.7883E−03 | 3.0587E−04 | −9.8708E−05 | −1.3206E−03 |
| A14 = −6.4971E−04 | −1.1967E−05 | −6.2417E−06 | 1.0323E−04 |
| A16 = | | 4.9168E−07 | −3.3973E−06 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 4.14 | T45/T56 | 0.66 |
| Fno | 1.77 | f/|R5| + f/|R6| | 2.13 |
| HFOV [deg.] | 38.6 | f/|R7| + f/|R8| | 1.00 |
| Nmax | 1.614 | f/R9 | 1.94 |
| V3 + V4 | 96.4 | f/R10 | 1.60 |
| |V3 − V4| | 15.5 | |f1/f6| | 0.52 |
| ATmax/ATmin | 2.39 | f34/f | 1.95 |
| CT2/T12 | 1.08 | f45/f | 4.01 |
| T12/T56 | 0.42 | f5/f | 4.11 |
| T23/T56 | 0.52 | TL/EPD | 2.12 |
| T34/T12 | 2.28 | TL/ImgH | 1.47 |
| T34/T56 | 0.96 | | |

7th Embodiment

Figure 7A:
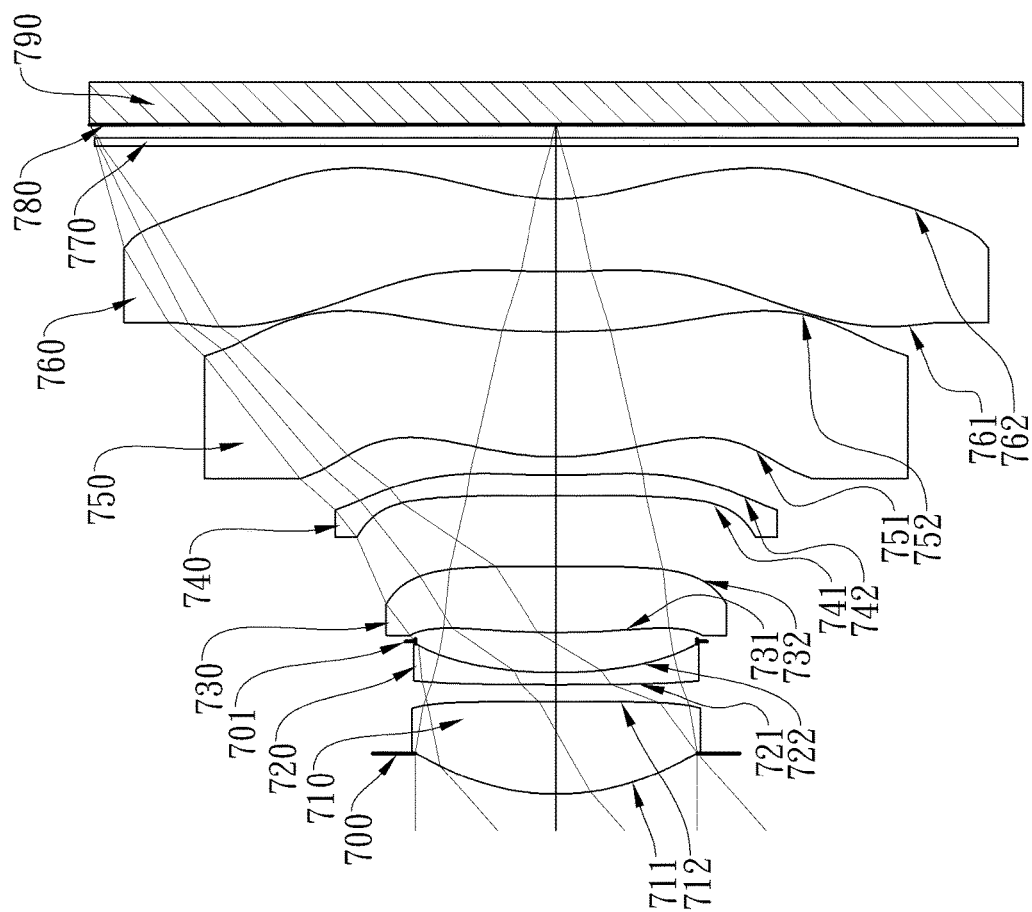
FIG. 7A is a schematic view of an imaging apparatus according to the 7th embodiment of the present disclosure.
Figure 7B:
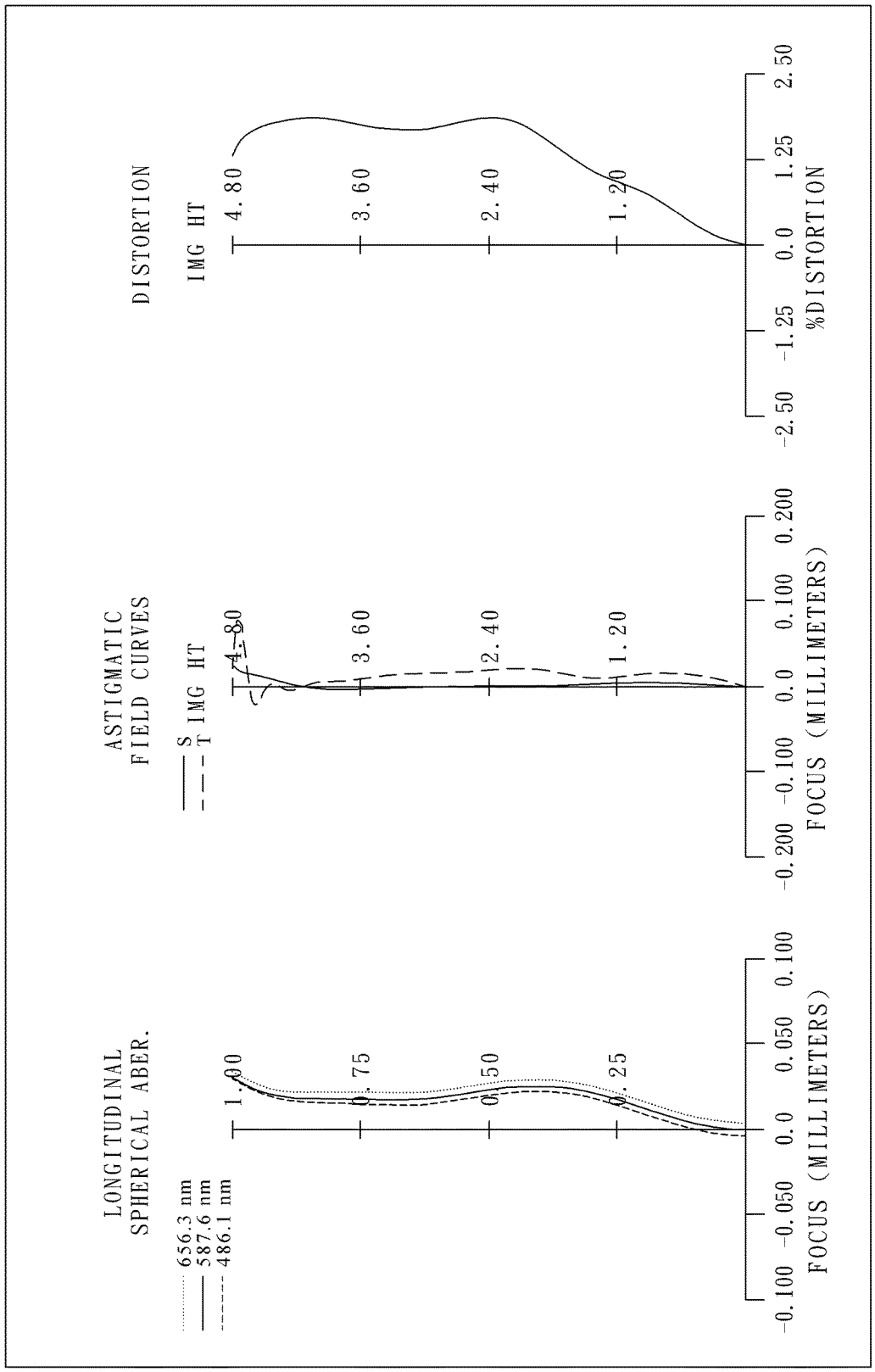
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an imaging optical lens (not otherwise herein labeled) of the present disclosure and an image sensor 790. The imaging optical lens includes six lens elements, the six lens elements being, in order from an object side to an image side, a first lens element 710, a second lens element 720, a third lens element 730, a fourth lens element 740, a fifth lens element 750, and a sixth lens element 760 and no other lens elements are inserted between the first lens element 710 and the sixth lens element 760.

The first lens element 710 with positive refractive power has an object-side surface 711 being convex in a paraxial region thereof, an image-side surface 712 being convex in a paraxial region thereof, and both the object-side surface 711 and the image-side surface 712 being aspheric. The first lens element 710 is made of plastic material.

The second lens element 720 with negative refractive power has an object-side surface 721 being convex in a paraxial region thereof, an image-side surface 722 being concave in a paraxial region thereof, and both the object-side surface 721 and the image-side surface 722 being aspheric. The second lens element 720 is made of plastic material.

The third lens element 730 with positive refractive power has an object-side surface 731 being convex in a paraxial region thereof, an image-side surface 732 being convex in a paraxial region thereof, and both the object-side surface 731 and the image-side surface 732 being aspheric. The third lens element 730 is made of plastic material.

The fourth lens element 740 with negative refractive power has an object-side surface 741 being concave in a paraxial region thereof, an image-side surface 742 being concave in a paraxial region thereof, and both the object-side surface 741 and the image-side surface 742 being aspheric. The fourth lens element 740 is made of plastic material.

The fifth lens element 750 with positive refractive power has an object-side surface 751 being convex in a paraxial region thereof, an image-side surface 752 being concave in a paraxial region thereof, both the object-side surface 751 and the image-side surface 752 being aspheric, and at least one critical point in both an off-axis region of the object-side surface 751 and an off-axis region of the image-side surface 752 thereof. The fifth lens element 750 is made of plastic material.

The sixth lens element 760 with negative refractive power has an object-side surface 761 being convex in a paraxial region thereof, an image-side surface 762 being concave in a paraxial region thereof, both the object-side surface 761 and the image-side surface 762 being aspheric, and at least one critical point in both an off-axis region of the object-side surface 761 and an off-axis region of the image-side surface 762 thereof. The sixth lens element 760 is made of plastic material.

The imaging optical lens further includes an aperture stop 700 disposed at an object side of the first lens element 710, a stop 701 disposed between the second lens element 720 and the third lens element 730, and a filter 770 disposed between the sixth lens element 760 and an image surface 780. The filter 770 is made of glass material and will not affect the focal length of the imaging optical lens. The image sensor 790 is disposed on or near the image surface 780 of the imaging optical lens.

The detailed optical data of the 7th embodiment are shown in TABLE 13, and the aspheric surface data are shown in TABLE 14.

TABLE 13

(7th Embodiment)
f = 5.34 mm, Fno = 1.84, HFOV = 41.5 deg.

| Surface # | | Curvature Radius | Thickness | Material | Index | Abbe # | Focal Length |
|---|---|---|---|---|---|---|---|
| 0 | Object | Planar | Infinity | | | | |
| 1 | Ape. Stop | Planar | −0.425 | | | | |

TABLE 13-continued (7th Embodiment)
f = 5.34 mm, Fno = 1.84, HFOV = 41.5 deg.

| Surface # | | Curvature Radius | | Thickness | Material | Index | Abbe # | Focal Length |
|---|---|---|---|---|---|---|---|---|
| 2 | Lens 1 | 2.525 | ASP | 0.956 | Plastic | 1.511 | 56.8 | 4.88 |
| 3 | | −176.367 | ASP | 0.173 | | | | |
| 4 | Lens 2 | 20.319 | ASP | 0.125 | Plastic | 1.639 | 23.2 | −7.57 |
| 5 | | 3.895 | ASP | 0.321 | | | | |
| 6 | Stop | Planar | | 0.092 | | | | |
| 7 | Lens 3 | 7.470 | ASP | 0.680 | Plastic | 1.544 | 56.0 | 13.35 |
| 8 | | −252.130 | ASP | 0.729 | | | | |
| 9 | Lens 4 | −202.840 | ASP | 0.214 | Plastic | 1.529 | 45.4 | −12.93 |
| 10 | | 7.083 | ASP | 0.189 | | | | |
| 11 | Lens 5 | 2.678 | ASP | 1.289 | Plastic | 1.544 | 56.0 | 6.19 |
| 12 | | 10.881 | ASP | 0.618 | | | | |
| 13 | Lens 6 | 8.193 | ASP | 0.750 | Plastic | 1.529 | 45.4 | −5.67 |
| 14 | | 2.127 | ASP | 0.550 | | | | |
| 15 | Filter | Planar | | 0.080 | Glass | 1.517 | 64.2 | — |
| 16 | | Planar | | 0.137 | | | | |
| 17 | Image Surface | Planar | | — | | | | |

\* Reference wavelength is d-line 587.6 nm.
\* The effective radius of Surface 6 is 1.450 mm.

TABLE 14

Aspheric Coefficients

| Surface # | | | | |
|---|---|---|---|---|
| | 2 | 3 | 4 | 5 |
| k = | −5.5142E−01 | 9.0000E+01 | 9.0000E+01 | −2.0258E+01 |
| A4 = | 1.3048E−03 | −5.8926E−03 | −6.3525E−02 | −2.0537E−02 |
| A6 = | 3.2098E−03 | 1.5970E−03 | 1.0145E−01 | 7.8170E−02 |
| A8 = | −3.6157E−03 | 2.4613E−03 | −7.6901E−02 | −6.1782E−02 |
| A10 = | 1.2835E−03 | −5.1504E−03 | 3.2353E−02 | 2.7661E−02 |
| A12 = | −1.2050E−04 | 2.0285E−03 | −7.5102E−03 | −6.7291E−03 |
| A14 = | −7.8850E−05 | −2.9125E−04 | 7.8638E−04 | 7.2984E−04 |

| Surface # | | | | |
|---|---|---|---|---|
| | 7 | 8 | 9 | 10 |
| k = | −1.7455E+01 | −9.0000E+01 | −9.0000E+01 | −9.0000E+01 |
| A4 = | −1.7623E−02 | −9.7752E−03 | −9.5698E−03 | −5.2138E−02 |
| A6 = | −3.4834E−03 | −1.0102E−02 | 2.2625E−03 | 1.0380E−02 |
| A8 = | 5.1575E−03 | 4.3997E−03 | −7.7120E−04 | −1.9413E−04 |
| A10 = | −6.2429E−03 | −1.9659E−03 | −2.6102E−04 | −6.0867E−04 |
| A12 = | 2.9212E−03 | 5.8787E−04 | 9.9809E−05 | 1.5411E−04 |
| A14 = | −6.1864E−04 | 1.4824E−04 | −1.6583E−05 | −1.1483E−05 |
| A16 = | | −3.5710E−05 | | |

| Surface # | | | | |
|---|---|---|---|---|
| | 11 | 12 | 13 | 14 |
| k = | −1.0380E+01 | 2.2311E+00 | −6.6681E+00 | −7.9136E−01 |
| A4 = | 1.9364E−03 | 2.6400E−02 | −6.7957E−02 | −8.4645E−02 |
| A6 = | −1.3769E−02 | −1.2094E−02 | 1.6143E−02 | 2.0234E−02 |
| A8 = | 4.2516E−03 | 2.1747E−03 | −2.1774E−03 | −3.5483E−03 |
| A10 = | −9.9278E−04 | −2.2616E−04 | 1.8731E−04 | 3.7294E−04 |
| A12 = | 1.3734E−04 | 1.2569E−05 | −1.0025E−05 | −2.2381E−05 |
| A14 = | −7.1690E−06 | −2.8061E−07 | 3.0613E−07 | 7.0833E−07 |
| A16 = | | | −4.1247E−09 | −9.2139E−09 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 5.34 | T45/T56 | 0.31 |
| Fno | 1.84 | f/|R5| + f/|R6| | 0.74 |
| HFOV [deg.] | 41.5 | f/|R7| + f/|R8| | 0.78 |
| Nmax | 1.639 | f/R9 | 2.00 |
| V3 + V4 | 101.4 | f/R10 | 0.49 |
| |V3 − V4| | 10.6 | |f1/f6| | 0.86 |
| ATmax/ATmin | 4.21 | f34/f | 37.04 |
| CT2/T12 | 0.72 | f45/f | 2.24 |
| T12/T56 | 0.28 | f5/f | 1.16 |
| T23/T56 | 0.67 | TL/EPD | 2.38 |
| T34/T12 | 4.21 | TL/ImgH | 1.44 |
| T34/T56 | 1.18 | | |

8th Embodiment

Figure 8A:
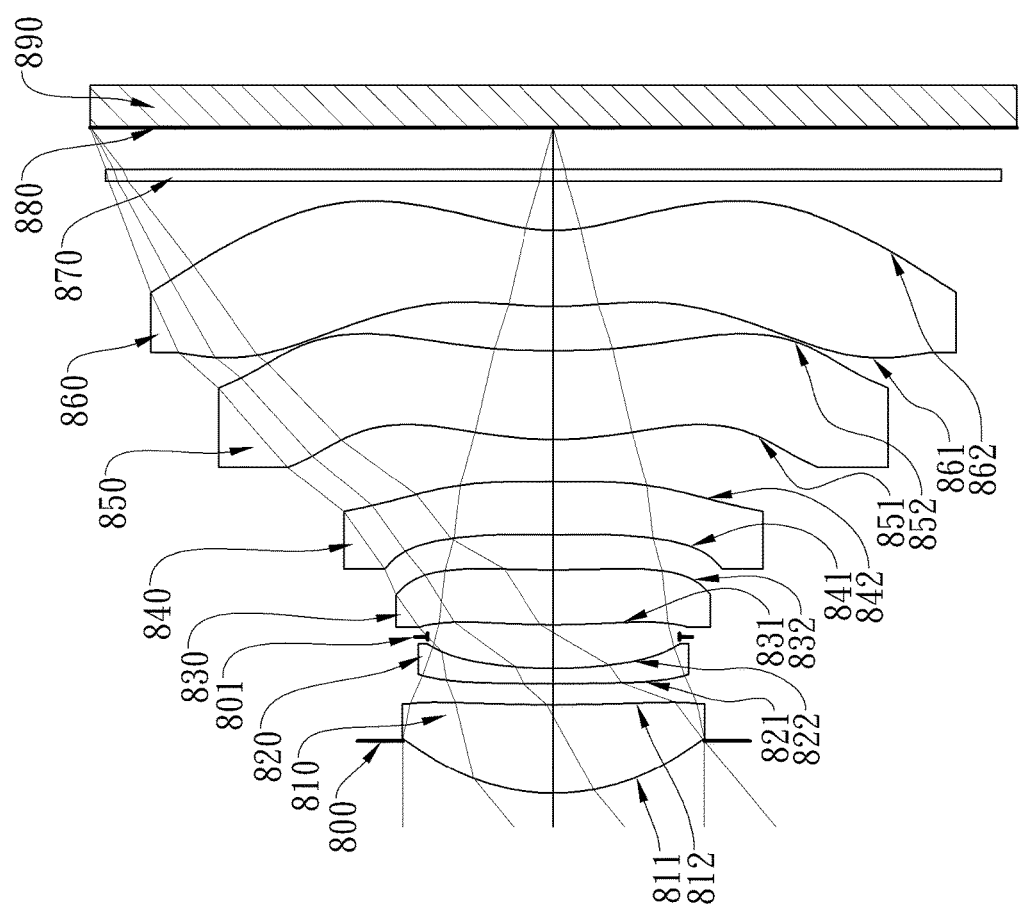
FIG. 8A is a schematic view of an imaging apparatus according to the 8th embodiment of the present disclosure.
Figure 8B:
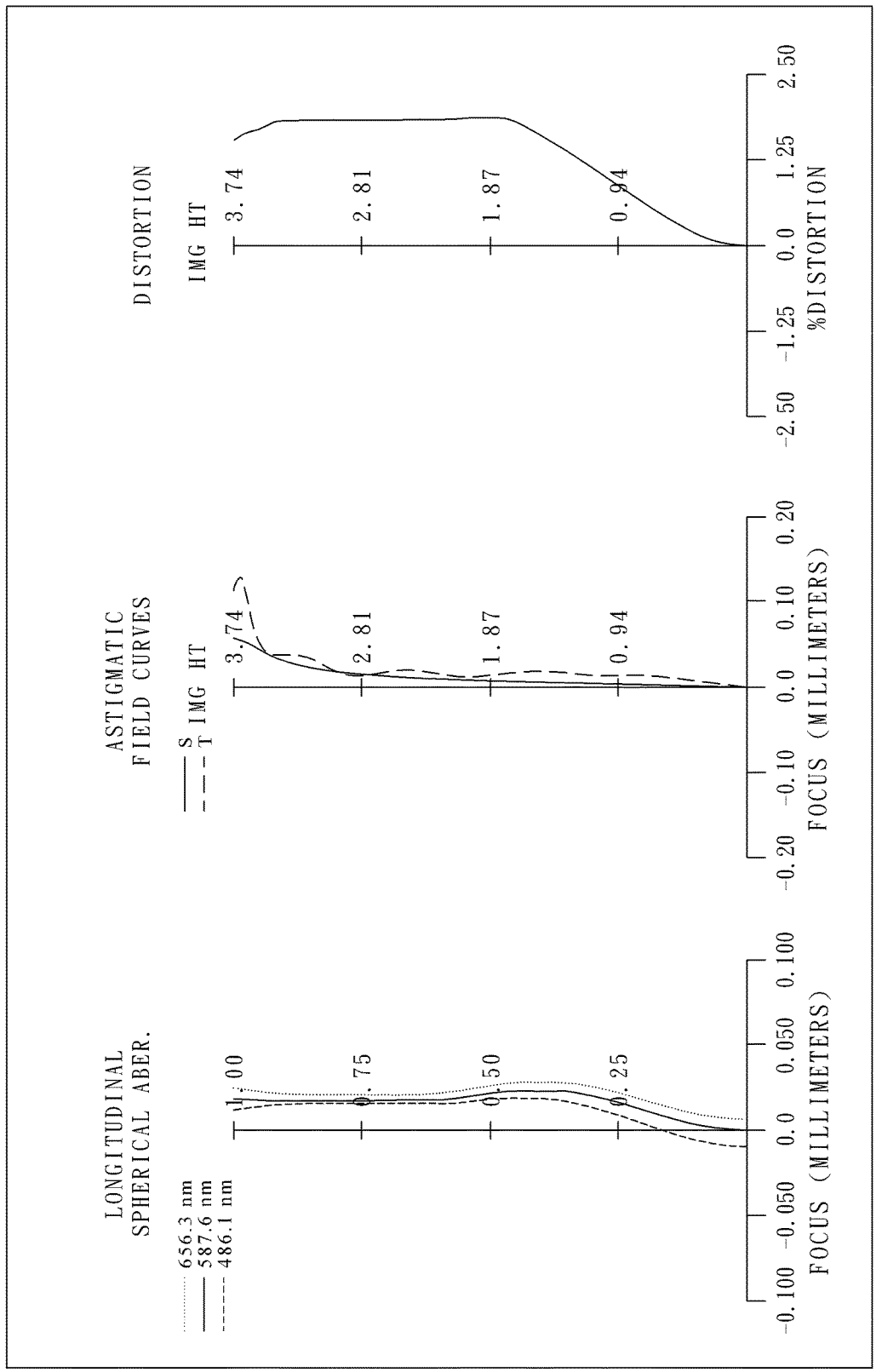
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an imaging optical lens (not otherwise herein labeled) of the present disclosure and an image sensor 890. The imaging optical lens includes six lens elements, the six lens elements being, in order from an object side to an image side, a first lens element 810, a second lens element 820, a third lens element 830, a fourth lens element 840, a fifth lens element 850, and a sixth lens element 860 and no other lens elements are inserted between the first lens element 810 and the sixth lens element 860.

The first lens element 810 with positive refractive power has an object-side surface 811 being convex in a paraxial region thereof, an image-side surface 812 being concave in a paraxial region thereof, and both the object-side surface 811 and the image-side surface 812 being aspheric. The first lens element 810 is made of plastic material.

The second lens element 820 with negative refractive power has an object-side surface 821 being convex in a paraxial region thereof, an image-side surface 822 being concave in a paraxial region thereof, and both the object-side surface 821 and the image-side surface 822 being aspheric. The second lens element 820 is made of plastic material.

The third lens element 830 with positive refractive power has an object-side surface 831 being convex in a paraxial region thereof, an image-side surface 832 being concave in a paraxial region thereof, and both the object-side surface 831 and the image-side surface 832 being aspheric. The third lens element 830 is made of plastic material.

The fourth lens element 840 with positive refractive power has an object-side surface 841 being concave in a paraxial region thereof, an image-side surface 842 being convex in a paraxial region thereof, and both the object-side surface 841 and the image-side surface 842 being aspheric. The fourth lens element 840 is made of plastic material.

The fifth lens element 850 with positive refractive power has an object-side surface 851 being convex in a paraxial region thereof, an image-side surface 852 being concave in a paraxial region thereof, both the object-side surface 851 and the image-side surface 852 being aspheric, and at least one critical point in both an off-axis region of the object-side surface 851 and an off-axis region of the image-side surface 852 thereof. The fifth lens element 850 is made of plastic material.

The sixth lens element 860 with negative refractive power has an object-side surface 861 being convex in a paraxial region thereof, an image-side surface 862 being concave in a paraxial region thereof, both the object-side surface 861 and the image-side surface 862 being aspheric, and at least one critical point in both an off-axis region of the object-side surface 861 and an off-axis region of the image-side surface 862 thereof. The sixth lens element 860 is made of plastic material.

In the imaging optical lens, each of the first lens element 810, the second lens element 820, the third lens element 830, the fifth lens element 850 and the sixth lens element 860 has both a curvature radius of the object-side surface and a curvature radius of the image-side surface thereof being positive. Three consecutive lens elements, the second lens element 820, the third lens element 830, and the fourth lens element 840, have Abbe numbers lower than 48.

The imaging optical lens further includes an aperture stop 800 disposed at an object side of the first lens element 810, a stop 801 disposed between the second lens element 820 and the third lens element 830, and a filter 870 disposed between the sixth lens element 860 and an image surface 880. The filter 870 is made of glass material and will not affect the focal length of the imaging optical lens. The image sensor 890 is disposed on or near the image surface 880 of the imaging optical lens.

The detailed optical data of the 8th embodiment are shown in TABLE 15, and the aspheric surface data are shown in TABLE 16.

TABLE 15

(8th Embodiment)
f = 4.45 mm, Fno = 1.82, HFOV = 39.6 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.425 | | | | |
| 2 | Lens 1 | 1.806 | ASP | 0.718 | Plastic | 1.545 | 56.1 | 3.87 |
| 3 | | 10.756 | ASP | 0.168 | | | | |
| 4 | Lens 2 | 7.385 | ASP | 0.125 | Plastic | 1.669 | 19.5 | −7.76 |
| 5 | | 3.027 | ASP | 0.258 | | | | |
| 6 | Stop | Planar | | 0.097 | | | | |
| 7 | Lens 3 | 6.252 | ASP | 0.443 | Plastic | 1.566 | 37.4 | 29.22 |
| 8 | | 9.795 | ASP | 0.287 | | | | |
| 9 | Lens 4 | −212.314 | ASP | 0.430 | Plastic | 1.566 | 37.4 | 446.26 |
| 10 | | −115.442 | ASP | 0.345 | | | | |
| 11 | Lens 5 | 3.186 | ASP | 0.716 | Plastic | 1.544 | 56.0 | 10.60 |
| 12 | | 6.557 | ASP | 0.360 | | | | |
| 13 | Lens 6 | 3.389 | ASP | 0.615 | Plastic | 1.511 | 56.8 | −5.88 |
| 14 | | 1.494 | ASP | 0.400 | | | | |
| 15 | Filter | Planar | | 0.100 | Glass | 1.517 | 64.2 | — |
| 16 | | Planar | | 0.336 | | | | |
| 17 | Image Surface | Planar | | | | | | |

\* Reference wavelength is d-line 587.6 nm.
\* The effective radius of Surface 6 is 1.020 mm.

TABLE 16

Aspheric Coefficients

| | Surface # | | | |
|---|---|---|---|---|
| | 2 | 3 | 4 | 5 |
| k = | −5.1615E−01 | −8.2404E+01 | −2.8930E+01 | −2.3593E+01 |
| A4 = | 8.4985E−03 | −4.8491E−02 | −2.2180E−01 | −9.8626E−02 |
| A6 = | 3.6432E−04 | 6.7066E−02 | 5.5017E−01 | 4.1856E−01 |
| A8 = | 8.5212E−03 | −5.9854E−02 | −6.5555E−01 | −4.9028E−01 |
| A10 = | −1.8663E−02 | 2.9905E−02 | 4.9325E−01 | 3.6016E−01 |
| A12 = | 1.4317E−02 | −1.0325E−02 | −2.1418E−01 | −1.4715E−01 |
| A14 = | −4.7338E−03 | 1.1024E−03 | 4.1040E−02 | 2.7890E−02 |

| | Surface # | | | |
|---|---|---|---|---|
| | 7 | 8 | 9 | 10 |
| k = | −2.2796E+01 | 2.5000E+01 | 9.0000E+01 | 9.0000E+01 |
| A4 = | −8.1090E−02 | −8.1757E−02 | −8.6774E−02 | −1.0706E−01 |
| A6 = | 4.7503E−02 | 1.3702E−02 | 4.1691E−02 | 2.7248E−02 |
| A8 = | −5.0270E−02 | −1.3196E−02 | −2.1306E−02 | 1.3140E−02 |
| A10 = | 1.4997E−02 | 4.6710E−03 | 1.1873E−02 | −7.7196E−03 |
| A12 = | 7.3134E−03 | −1.5715E−02 | −8.5370E−03 | 1.2415E−03 |

TABLE 16-continued

| Aspheric Coefficients | | | | |
|---|---|---|---|---|
| A14 = | −7.8445E−03 | 1.1097E−02 | 1.3379E−03 | −4.6656E−05 |
| A16 = | | −2.9776E−03 | | |

| Surface # | | | | |
|---|---|---|---|---|
| | 11 | 12 | 13 | 14 |
| k = | −3.5566E+00 | −2.0012E+01 | −4.7391E+00 | −4.9426E+00 |
| A4 = | −1.4804E−02 | 4.3406E−02 | −1.8524E−01 | −9.2290E−02 |
| A6 = | −4.0955E−02 | −3.9079E−02 | 8.3616E−02 | 3.8629E−02 |
| A8 = | 2.3442E−02 | 1.3318E−02 | −2.2753E−02 | −1.1665E−02 |
| A10 = | −7.6574E−03 | −2.6875E−03 | 3.8959E−03 | 2.1264E−03 |
| A12 = | 1.3549E−03 | 2.8774E−04 | −3.9811E−04 | −2.2036E−04 |
| A14 = | −9.3458E−05 | −1.2148E−05 | 2.2081E−05 | 1.1981E−05 |
| A16 = | | | −5.1175E−07 | −2.6534E−07 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 4.45 | T45/T56 | 0.96 |
| Fno | 1.82 | f/|R5| + f/|R6| | 1.17 |
| HFOV [deg.] | 39.6 | f/|R7| + f/|R8| | 0.06 |
| Nmax | 1.669 | f/R9 | 1.40 |
| V3 + V4 | 74.9 | f/R10 | 0.68 |
| |V3 − V4| | 0.0 | |f1/f6| | 0.66 |
| ATmax/ATmin | 2.14 | f34/f | 6.19 |
| CT2/T12 | 0.74 | f45/f | 2.33 |
| T12/T56 | 0.47 | f5/f | 2.38 |
| T23/T56 | 0.99 | TL/EPD | 2.21 |
| T34/T12 | 1.71 | TL/ImgH | 1.44 |
| T34/T56 | 0.80 | | |

9th Embodiment

Figure 9A:
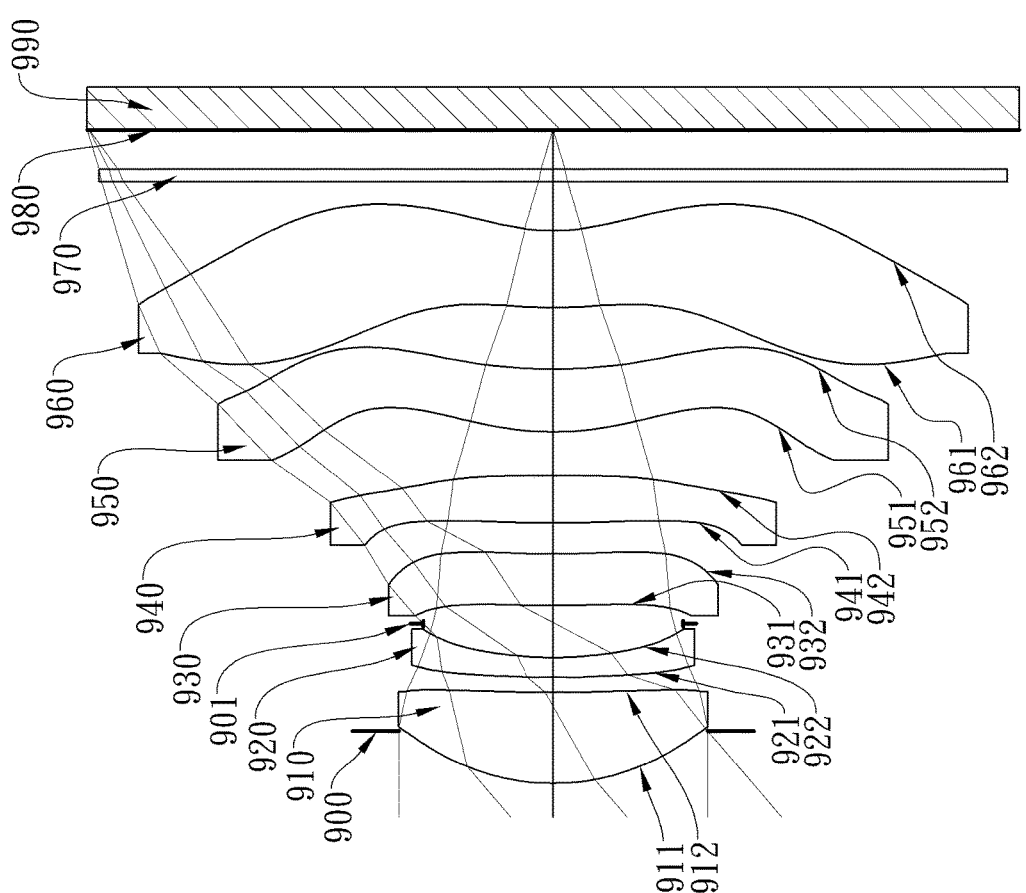
FIG. 9A is a schematic view of an imaging apparatus according to the 9th embodiment of the present disclosure.
Figure 9B:
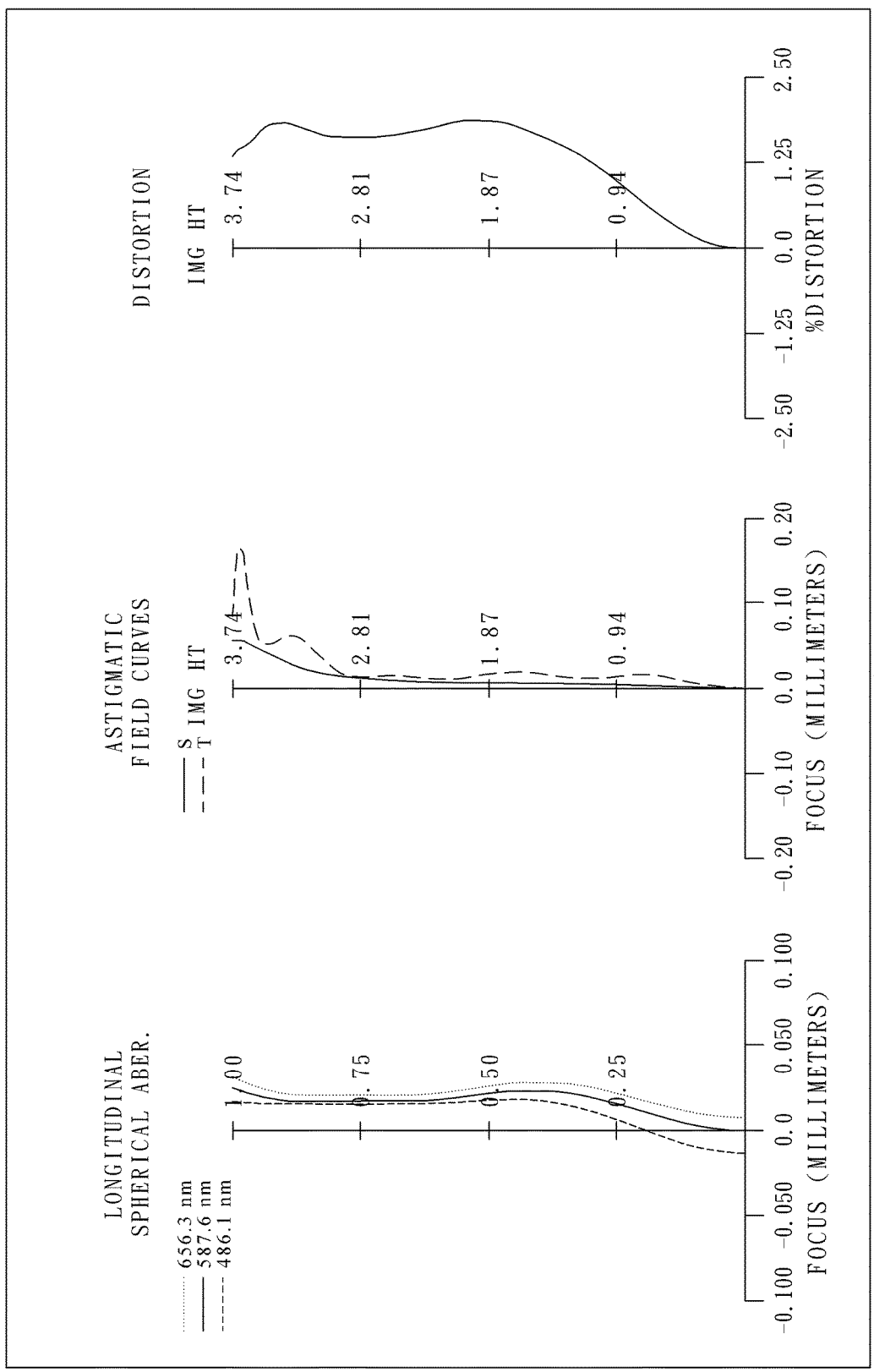
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes an imaging optical lens (not otherwise herein labeled) of the present disclosure and an image sensor 990. The imaging optical lens includes six lens elements, the six lens elements being, in order from an object side to an image side, a first lens element 910, a second lens element 920, a third lens element 930, a fourth lens element 940, a fifth lens element 950, and a sixth lens element 960 and no other lens elements are inserted between the first lens element 910 and the sixth lens element 960.

The first lens element 910 with positive refractive power has an object-side surface 911 being convex in a paraxial region thereof, an image-side surface 912 being concave in a paraxial region thereof, and both the object-side surface 911 and the image-side surface 912 being aspheric. The first lens element 910 is made of plastic material.

The second lens element 920 with negative refractive power has an object-side surface 921 being convex in a paraxial region thereof, an image-side surface 922 being concave in a paraxial region thereof, and both the object-side surface 921 and the image-side surface 922 being aspheric. The second lens element 920 is made of plastic material.

The third lens element 930 with negative refractive power has an object-side surface 931 being convex in a paraxial region thereof, an image-side surface 932 being concave in a paraxial region thereof, and both the object-side surface 931 and the image-side surface 932 being aspheric. The third lens element 930 is made of plastic material.

The fourth lens element 940 with positive refractive power has an object-side surface 941 being convex in a paraxial region thereof, an image-side surface 942 being concave in a paraxial region thereof, and both the object-side surface 941 and the image-side surface 942 being aspheric. The fourth lens element 940 is made of plastic material.

The fifth lens element 950 with positive refractive power has an object-side surface 951 being convex in a paraxial region thereof, an image-side surface 952 being concave in a paraxial region thereof, both the object-side surface 951 and the image-side surface 952 being aspheric, and at least one critical point in both an off-axis region of the object-side surface 951 and an off-axis region of the image-side surface 952 thereof. The fifth lens element 950 is made of plastic material.

The sixth lens element 960 with negative refractive power has an object-side surface 961 being convex in a paraxial region thereof, an image-side surface 962 being concave in a paraxial region thereof, both the object-side surface 961 and the image-side surface 962 being aspheric, and at least one critical point in both an off-axis region of the object-side surface 961 and an off-axis region of the image-side surface 962 thereof. The sixth lens element 960 is made of plastic material.

In the imaging optical lens, each of the first lens element 910, the second lens element 920, the third lens element 930, the fourth lens element 940, the fifth lens element 950 and the sixth lens element 960 has both a curvature radius of the object-side surface and a curvature radius of the image-side surface thereof being positive. Three consecutive lens elements, the second lens element 920, the third lens element 930, and the fourth lens element 940, have Abbe numbers lower than 48.

The imaging optical lens further includes an aperture stop 900 disposed at an object side of the first lens element 910, a stop 901 disposed between the second lens element 920 and the third lens element 930, and a filter 970 disposed between the sixth lens element 960 and an image surface 980. The filter 970 is made of glass material and will not affect the focal length of the imaging optical lens. The image sensor 990 is disposed on or near the image surface 980 of the imaging optical lens.

The detailed optical data of the 9th embodiment are shown in TABLE 17, and the aspheric surface data are shown in TABLE 18.

TABLE 17

(9th Embodiment)
f = 4.31 mm, Fno = 1.73, HFOV = 40.5 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.425 | | | | |
| 2 | Lens 1 | 1.836 | ASP | 0.737 | Plastic | 1.544 | 56.0 | 4.05 |
| 3 | | 9.519 | ASP | 0.120 | | | | |
| 4 | Lens 2 | 5.224 | ASP | 0.161 | Plastic | 1.669 | 19.5 | −8.80 |
| 5 | | 2.733 | ASP | 0.273 | | | | |
| 6 | Stop | Planar | | 0.146 | | | | |
| 7 | Lens 3 | 8.683 | ASP | 0.418 | Plastic | 1.559 | 40.4 | −74.63 |
| 8 | | 7.062 | ASP | 0.248 | | | | |
| 9 | Lens 4 | 8.037 | ASP | 0.380 | Plastic | 1.529 | 45.4 | 20.69 |
| 10 | | 29.731 | ASP | 0.361 | | | | |
| 11 | Lens 5 | 2.412 | ASP | 0.508 | Plastic | 1.544 | 56.0 | 8.33 |
| 12 | | 4.773 | ASP | 0.496 | | | | |
| 13 | Lens 6 | 3.757 | ASP | 0.618 | Plastic | 1.544 | 56.0 | −5.11 |
| 14 | | 1.505 | ASP | 0.400 | | | | |
| 15 | Filter | Planar | | 0.100 | Glass | 1.517 | 64.2 | — |
| 16 | | Planar | | 0.319 | | | | |
| 17 | Image Surface | Planar | | — | | | | |

\* Reference wavelength is d-line 587.6 nm.
\* The effective radius of Surface 6 is 1.050 mm.

TABLE 18

Aspheric Coefficients

| Surface # | | | | |
|---|---|---|---|---|
| | 2 | 3 | 4 | 5 |
| k = | −4.8506E−01 | −8.5530E+01 | −3.4002E+01 | −1.9657E+01 |
| A4 = | 7.3041E−03 | −7.3880E−02 | −1.8466E−01 | −3.7178E−02 |
| A6 = | 2.3982E−03 | 1.1936E−01 | 4.1251E−01 | 2.3603E−01 |
| A8 = | 4.8273E−03 | −1.1723E−01 | −4.4097E−01 | −2.4043E−01 |
| A10 = | −1.3896E−02 | 7.0724E−02 | 3.0248E−01 | 1.6179E−01 |
| A12 = | 1.1457E−02 | −2.7408E−02 | −1.2375E−01 | −6.4003E−02 |
| A14 = | −3.8526E−03 | 4.3388E−03 | 2.3057E−02 | 1.3362E−02 |

| Surface # | | | | |
|---|---|---|---|---|
| | 7 | 8 | 9 | 10 |
| k = | −6.6352E+01 | 1.6961E+01 | 2.1066E+01 | −9.0000E+01 |
| A4 = | −8.2460E−02 | −9.3448E−02 | −7.9855E−02 | −1.1566E−01 |
| A6 = | 2.7425E−02 | 1.0120E−02 | 3.7760E−02 | 3.1614E−02 |
| A8 = | −2.9949E−02 | −8.2923E−04 | −1.0420E−03 | 2.0922E−02 |
| A10 = | −7.6989E−03 | −2.3875E−02 | −1.3926E−02 | −1.3344E−02 |
| A12 = | 2.2703E−02 | 1.2184E−02 | 5.5359E−03 | 2.4170E−03 |
| A14 = | −1.2420E−02 | −9.4829E−04 | −8.7702E−04 | −1.2309E−04 |
| A16 = | | −7.4240E−04 | | |

| Surface # | | | | |
|---|---|---|---|---|
| | 11 | 12 | 13 | 14 |
| k = | −3.0936E+00 | −9.9719E+00 | −8.3512E+00 | −5.6859E+00 |
| A4 = | −2.1292E−04 | 5.5360E−02 | −1.9553E−01 | −8.6765E−02 |
| A6 = | −4.4373E−02 | −5.3334E−02 | 7.8374E−02 | 3.1511E−02 |
| A8 = | 2.0218E−02 | 1.8011E−02 | −1.7334E−02 | −8.4229E−03 |
| A10 = | −6.0175E−03 | −3.4909E−03 | 2.4614E−03 | 1.3964E−03 |
| A12 = | 1.0312E−03 | 3.6526E−04 | −2.1997E−04 | −1.3338E−04 |
| A14 = | −6.8903E−05 | −1.5435E−05 | 1.1151E−05 | 6.7631E−06 |
| A16 = | | | −2.4291E−07 | −1.4156E−07 |

In the 9th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in table below.

| 9th Embodiment | | | |
|---|---|---|---|
| f [mm] | 4.31 | T45/T56 | 0.73 |
| Fno | 1.73 | f/|R5| + f/|R6| | 1.11 |
| HFOV [deg.] | 40.5 | f/|R7| + f/|R8| | 0.68 |
| Nmax | 1.669 | f/R9 | 1.79 |
| V3 + V4 | 85.8 | f/R10 | 0.90 |
| |V3 − V4| | 4.9 | |f1/f6| | 0.79 |
| ATmax/ATmin | 4.13 | f34/f | 6.78 |
| CT2/T12 | 1.34 | f45/f | 1.40 |
| T12/T56 | 0.24 | f5/f | 1.93 |
| T23/T56 | 0.84 | TL/EPD | 2.12 |
| T34/T12 | 2.07 | TL/ImgH | 1.41 |
| T34/T56 | 0.50 | | |

10th Embodiment

Figure 10A:
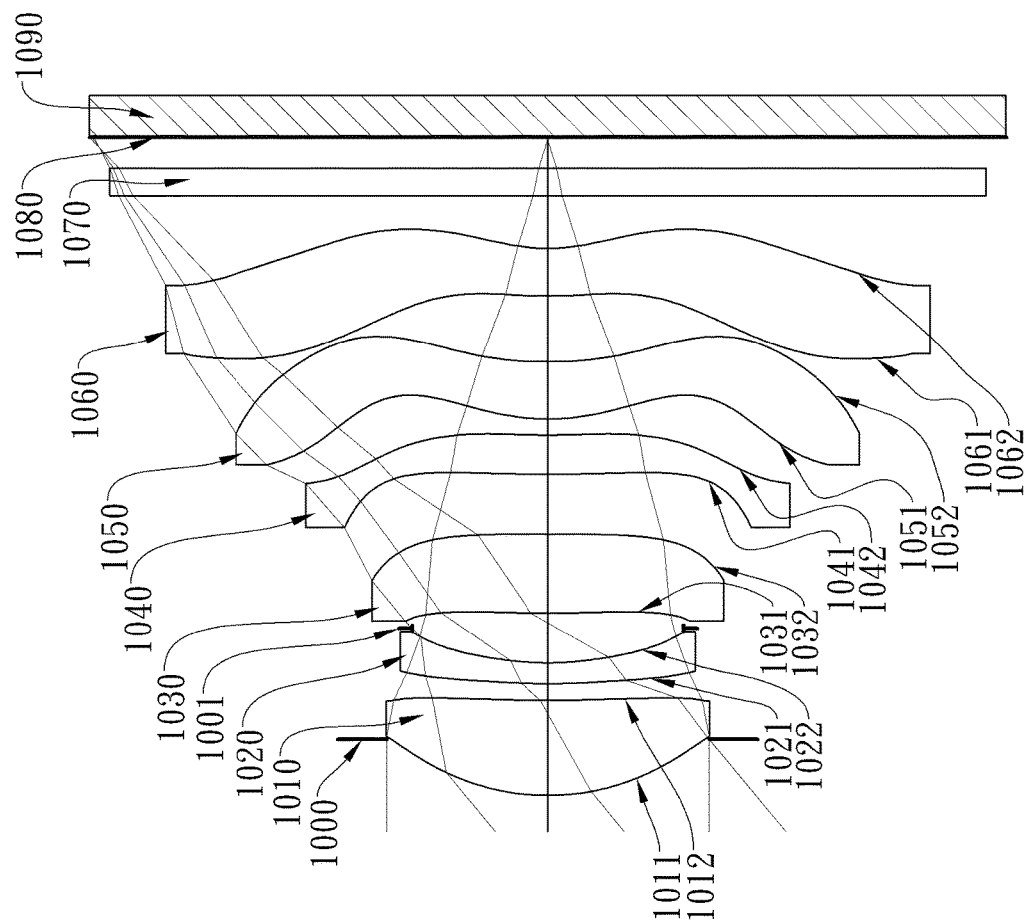
FIG. 10A is a schematic view of an imaging apparatus according to the 10th embodiment of the present disclosure.
Figure 10B:
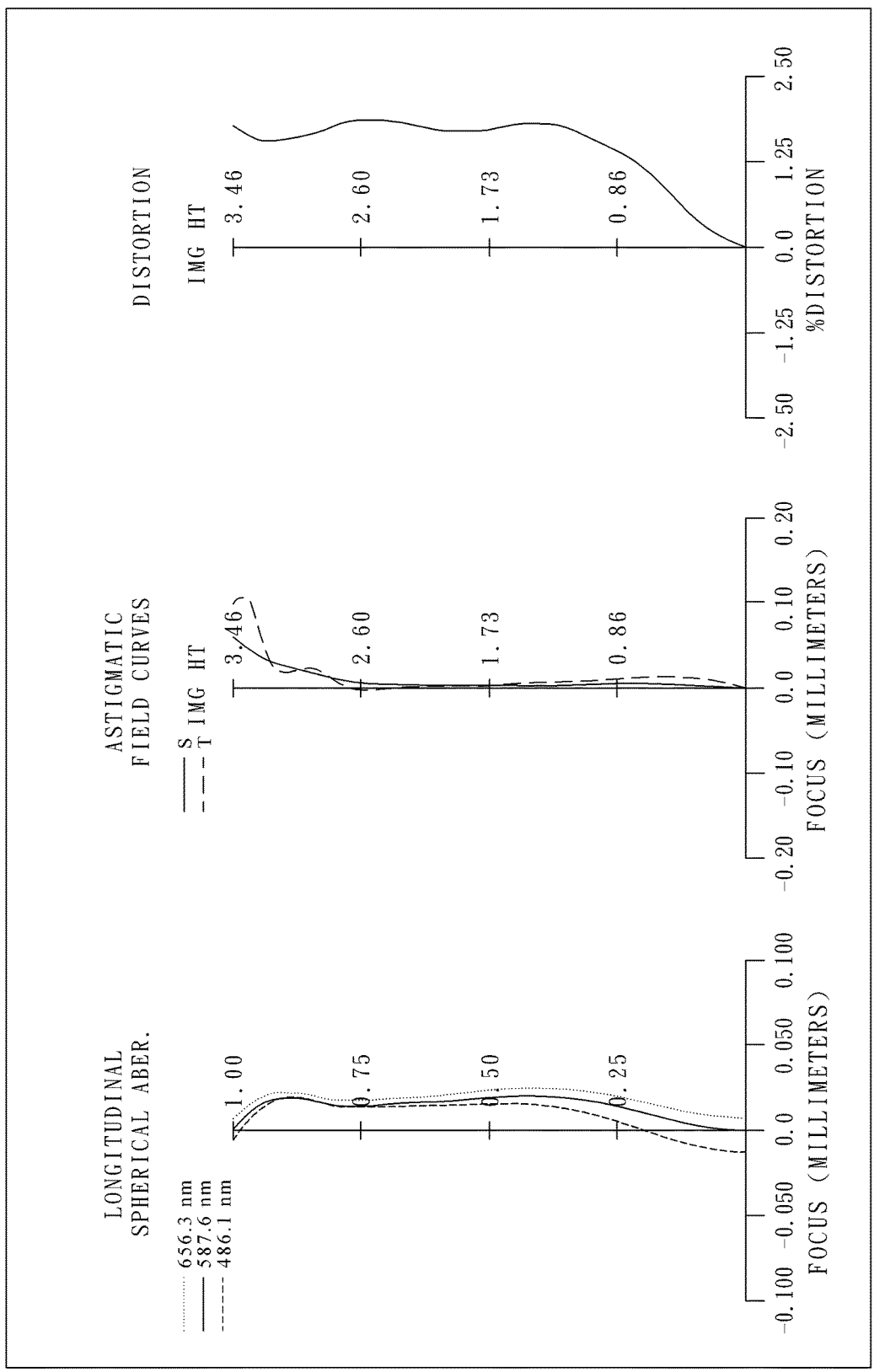
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes an imaging optical lens (not otherwise herein labeled) of the present disclosure and an image sensor 1090. The imaging optical lens includes six lens elements, the six lens elements being, in order from an object side to an image side, a first lens element 1010, a second lens element 1020, a third lens element 1030, a fourth lens element 1040, a fifth lens element 1050, and a sixth lens element 1060 and no other lens elements are inserted between the first lens element 1010 and the sixth lens element 1060.

The first lens element 1010 with positive refractive power has an object-side surface 1011 being convex in a paraxial region thereof, an image-side surface 1012 being concave in a paraxial region thereof, and both the object-side surface 1011 and the image-side surface 1012 being aspheric. The first lens element 1010 is made of plastic material.

The second lens element 1020 with negative refractive power has an object-side surface 1021 being convex in a paraxial region thereof, an image-side surface 1022 being concave in a paraxial region thereof, and both the object-side surface 1021 and the image-side surface 1022 being aspheric. The second lens element 1020 is made of plastic material.

The third lens element 1030 with positive refractive power has an object-side surface 1031 being convex in a paraxial region thereof, an image-side surface 1032 being concave in a paraxial region thereof, and both the object-side surface 1031 and the image-side surface 1032 being aspheric. The third lens element 1030 is made of plastic material.

The fourth lens element 1040 with negative refractive power has an object-side surface 1041 being convex in a paraxial region thereof, an image-side surface 1042 being concave in a paraxial region thereof, and both the object-side surface 1041 and the image-side surface 1042 being aspheric. The fourth lens element 1040 is made of plastic material.

The fifth lens element 1050 with positive refractive power has an object-side surface 1051 being convex in a paraxial region thereof, an image-side surface 1052 being concave in a paraxial region thereof, both the object-side surface 1051 and the image-side surface 1052 being aspheric, and at least one critical point in both an off-axis region of the object-side surface 1051 and an off-axis region of the image-side surface 1052 thereof. The fifth lens element 1050 is made of plastic material.

The sixth lens element 1060 with negative refractive power has an object-side surface 1061 being convex in a paraxial region thereof, an image-side surface 1062 being concave in a paraxial region thereof, both the object-side surface 1061 and the image-side surface 1062 being aspheric, and at least one critical point in both an off-axis region of the object-side surface 1061 and an off-axis region of the image-side surface 1062 thereof. The sixth lens element 1060 is made of plastic material.

In the imaging optical lens, each of the first lens element 1010, the second lens element 1020, the third lens element 1030, the fourth lens element 1040, the fifth lens element 1050 and the sixth lens element 1060 has both a curvature radius of the object-side surface and a curvature radius of the image-side surface thereof being positive. Three consecutive lens elements, the second lens element 1020, the third lens element 1030, and the fourth lens element 1040, have Abbe numbers lower than 48.

The imaging optical lens further includes an aperture stop 1000 disposed at an object side of the first lens element 1010, a stop 1001 disposed between the second lens element 1020 and the third lens element 1030, and a filter 1070 disposed between the sixth lens element 1060 and an image surface 1080. The filter 1070 is made of glass material and will not affect the focal length of the imaging optical lens. The image sensor 1090 is disposed on or near the image surface 1080 of the imaging optical lens.

The detailed optical data of the 10th embodiment are shown in TABLE 19, and the aspheric surface data are shown in TABLE 20.

TABLE 19

(10th Embodiment)
f = 4.07 mm, Fno = 1.66, HFOV = 39.8 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.425 | | | | |
| 2 | Lens 1 | 1.790 | ASP | 0.721 | Plastic | 1.545 | 56.1 | 3.97 |
| 3 | | 8.887 | ASP | 0.126 | | | | |
| 4 | Lens 2 | 3.659 | ASP | 0.160 | Plastic | 1.669 | 19.5 | −7.95 |
| 5 | | 2.130 | ASP | 0.263 | | | | |
| 6 | Stop | Planar | | 0.116 | | | | |
| 7 | Lens 3 | 9.087 | ASP | 0.600 | Plastic | 1.529 | 45.4 | 18.04 |
| 8 | | 184.159 | ASP | 0.455 | | | | |
| 9 | Lens 4 | 10.324 | ASP | 0.298 | Plastic | 1.529 | 45.4 | −22.83 |
| 10 | | 5.512 | ASP | 0.122 | | | | |
| 11 | Lens 5 | 1.630 | ASP | 0.436 | Plastic | 1.544 | 56.0 | 5.25 |
| 12 | | 3.435 | ASP | 0.501 | | | | |
| 13 | Lens 6 | 3.154 | ASP | 0.362 | Plastic | 1.534 | 55.9 | −4.46 |
| 14 | | 1.303 | ASP | 0.400 | | | | |
| 15 | Filter | Planar | | 0.210 | Glass | 1.517 | 64.2 | — |
| 16 | | Planar | | 0.233 | | | | |
| 17 | Image Surface | Planar | | — | | | | |

* Reference wavelength is d-line 587.6 nm.
* The effective radius of Surface 6 is 1.030 mm.

TABLE 20

Aspheric Coefficients

| | Surface # | | | |
|---|---|---|---|---|
| | 2 | 3 | 4 | 5 |
| k = | −3.0459E−01 | −9.0000E+01 | −5.4762E+01 | −1.7564E+01 |
| A4 = | 5.6558E−03 | −8.3561E−02 | −1.7731E−01 | −3.3202E−02 |
| A6 = | −7.7636E−03 | 1.4648E−01 | 3.8411E−01 | 2.0012E−01 |
| A8 = | 2.6243E−02 | −1.5000E−01 | −3.7274E−01 | −1.3758E−01 |
| A10 = | −4.0588E−02 | 8.2194E−02 | 2.0397E−01 | 1.8204E−02 |
| A12 = | 2.8054E−02 | −2.5616E−02 | −5.7846E−02 | 3.1808E−02 |
| A14 = | −8.4215E−03 | 2.5815E−03 | 6.9809E−03 | −1.0266E−02 |

TABLE 20-continued

Aspheric Coefficients

| Surface # | | | | |
|---|---|---|---|---|
| | 7 | 8 | 9 | 10 |
| k = | −4.4348E+01 | −9.0000E+01 | −8.4165E+00 | −9.0000E+01 |
| A4 = | −7.0268E−02 | −6.1406E−02 | −6.8628E−02 | −2.1017E−01 |
| A6 = | 9.0834E−03 | −1.4177E−02 | 1.0090E−01 | 1.8237E−01 |
| A8 = | 8.5540E−03 | −2.9138E−03 | −1.3714E−01 | −1.3603E−01 |
| A10 = | −5.3891E−02 | 1.0804E−02 | 8.2788E−02 | 5.8208E−02 |
| A12 = | 5.2563E−02 | −1.8961E−02 | −2.6277E−02 | −1.1807E−02 |
| A14 = | −2.2626E−02 | 1.0966E−02 | 3.1742E−03 | 8.9867E−04 |
| A16 = | | −2.5812E−03 | | |

| Surface # | | | | |
|---|---|---|---|---|
| | 11 | 12 | 13 | 14 |
| k = | −4.2291E+00 | −9.5844E+00 | −2.0971E+00 | −1.1969E+00 |
| A4 = | −1.9074E−02 | 1.7129E−01 | −3.6736E−01 | −4.0356E−01 |
| A6 = | −3.9264E−02 | −2.2654E−01 | 1.9877E−01 | 2.8336E−01 |
| A8 = | −2.6348E−02 | 1.2225E−01 | −5.8135E−02 | −1.4846E−01 |
| A10 = | 2.4117E−02 | −3.9760E−02 | 1.0042E−02 | 5.2719E−02 |
| A12 = | −6.3105E−03 | 7.7982E−03 | −9.0271E−04 | −1.2088E−02 |
| A14 = | 7.1065E−04 | −8.3373E−04 | 1.0758E−05 | 1.7535E−03 |
| A16 = | −2.9802E−05 | 3.6810E−05 | 5.5503E−06 | −1.5514E−04 |
| A18 = | | | −4.6692E−07 | 7.6346E−06 |
| A20 = | | | 1.2057E−08 | −1.6011E−07 |

In the 10th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in table below.

| 10th Embodiment | | | |
|---|---|---|---|
| f [mm] | 4.07 | T45/T56 | 0.24 |
| Fno | 1.66 | f/|R5| + f/|R6| | 0.47 |
| HFOV [deg.] | 39.8 | f/|R7| + f/|R8| | 1.13 |
| Nmax | 1.669 | f/R9 | 2.50 |
| V3 + V4 | 90.8 | f/R10 | 1.18 |
| |V3 − V4| | 0.0 | |f1/f6| | 0.89 |
| ATmax/ATmin | 4.11 | f34/f | 16.64 |
| CT2/T12 | 1.27 | f45/f | 1.71 |
| T12/T56 | 0.25 | f5/f | 1.29 |
| T23/T56 | 0.76 | TL/EPD | 2.04 |
| T34/T12 | 3.61 | TL/ImgH | 1.45 |
| T34/T56 | 0.91 | | |

11th Embodiment

Figure 12:
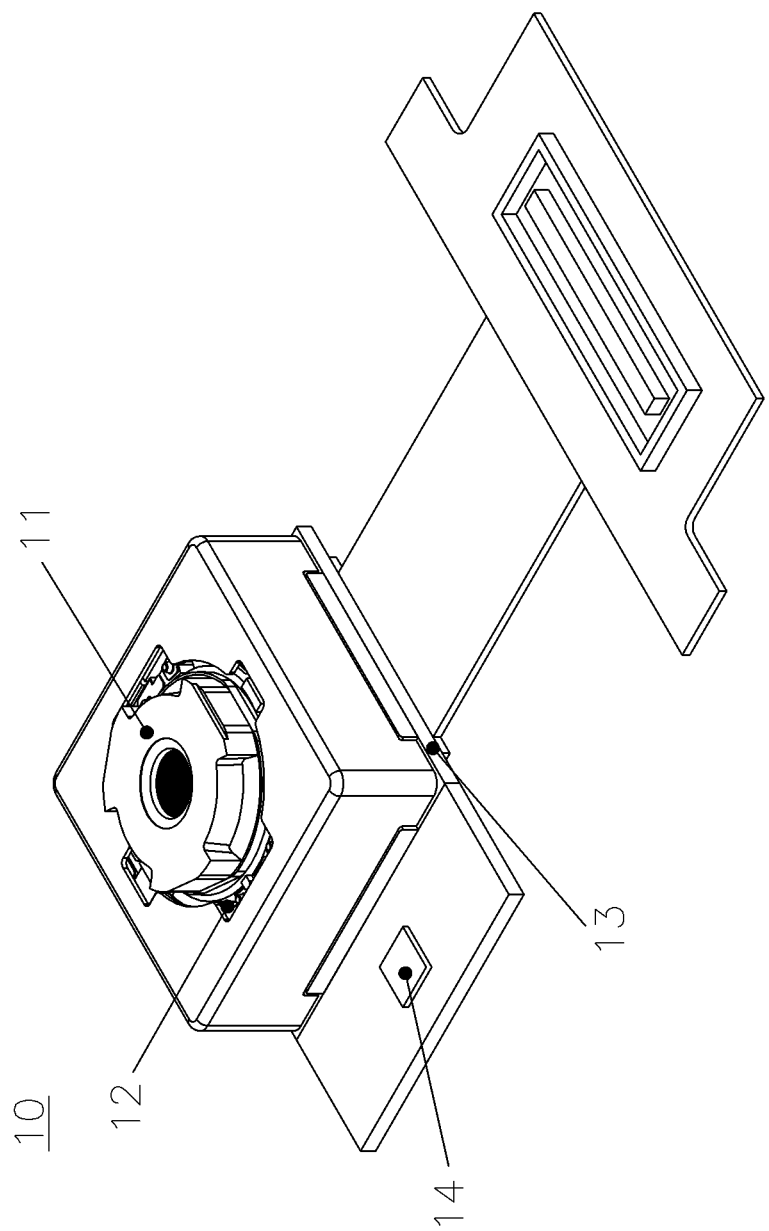
FIG. 12 is a 3-dimensional schematic view of an imaging apparatus according to the 11th embodiment of the present disclosure.

FIG. 12 is a 3-dimensional schematic view of an imaging apparatus 10 according to the 11th embodiment of the present disclosure. In the present embodiment, the imaging apparatus 10 is a camera module. The imaging apparatus 10 includes a lens unit 11, a driving device 12, and an image sensor 13. The lens unit 11 includes the imaging optical lens of the 1st embodiment described above and a lens barrel (not otherwise herein labeled) for carrying the imaging optical lens. The imaging apparatus 10 retrieves light and generates an image by using the lens unit 11, using the driving device 12 to adjust the focus to photograph on the image sensor 13 and outputs the image data thereafter.

The driving device 12 may be an auto-focus model that can be driven by a voice coil motor (VCM), a micro electro-mechanical system (MEMS), a piezoelectric system, shape memory metal or other driving systems. The driving device 12 allows the lens unit 11 to obtain a better imaging position, providing a clear image wherever an imaged object 30 (Please refer to FIG. 13B) being positioned with different object distances.

The imaging apparatus 10 may be configured to equip the image sensor 13 (e.g., CMOS, CCD) with high sensitivity and low noise on the image surface of the imaging optical lens to truly provide the satisfactory image quality obtained from the imaging optical lens.

In addition, the imaging apparatus 10 may further include an image stabilizer 14, which may be a dynamic sensing element such as accelerometer, a gyroscope or a Hall Effect sensor. The image stabilizer 14 in the 11th embodiment is a gyroscope but not limited. By adjusting the imaging optical lens in different axial directions to provide a compensation for image blurs due to motion during exposures, the image quality under dynamic and low-light circumstances can be further improved and enhanced image compensation functions such as optical image stabilization (OIS) or electronic image stabilization (EIS) can also be provided.

12th Embodiment

Figure 13A:
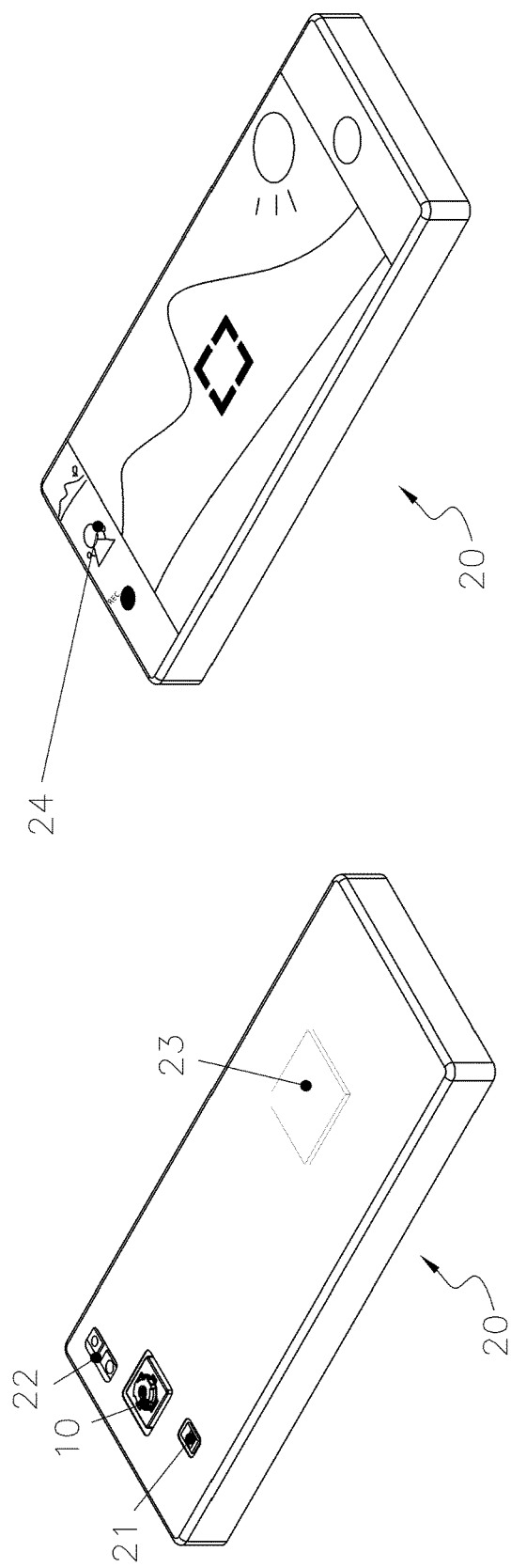
FIG. 13A is a 3-dimensional schematic view of an electronic device according to the 12th embodiment of the present disclosure.
Figure 13B:
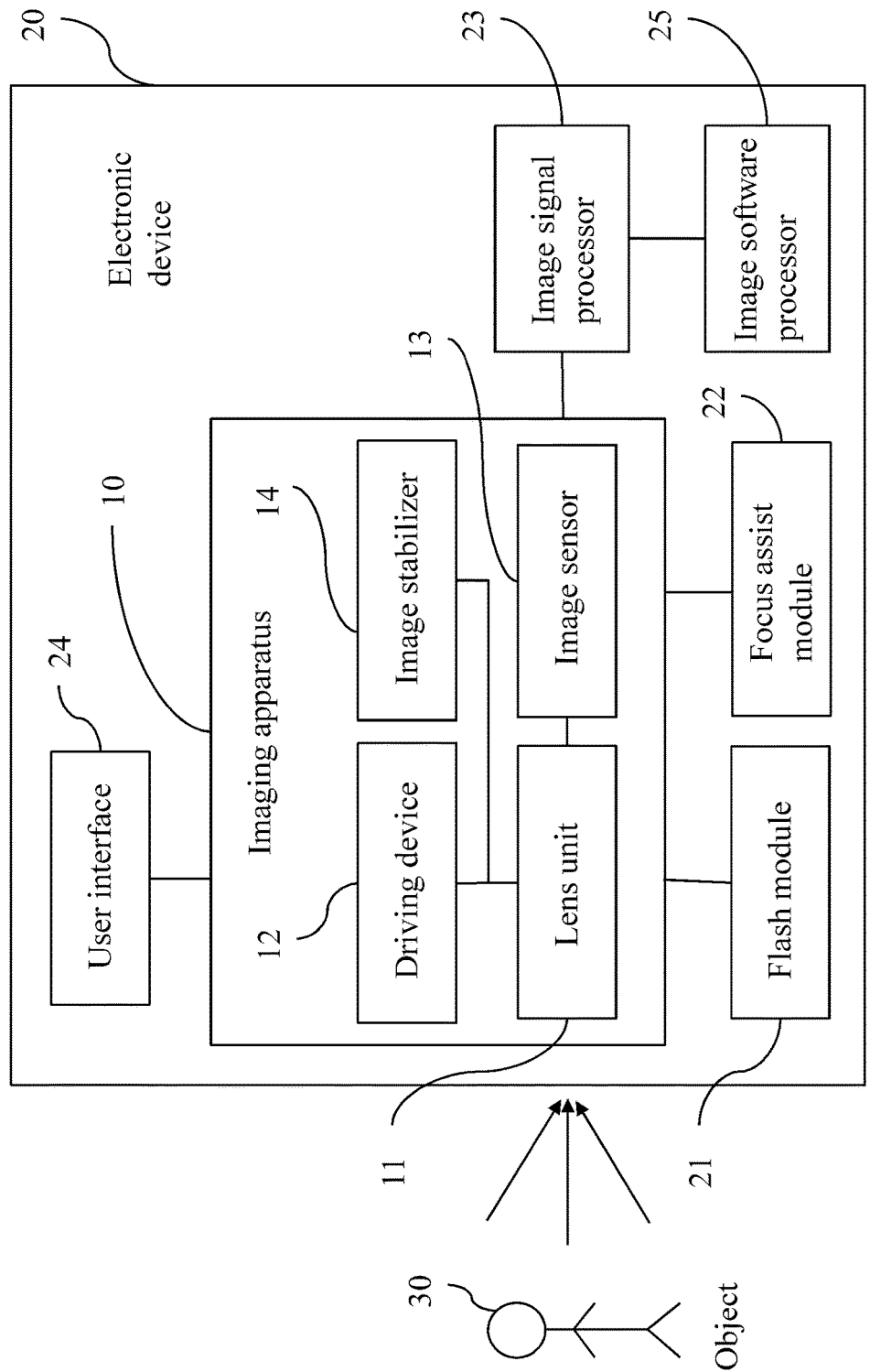
FIG. 13B is a schematic view of the electronic device according to the 12th embodiment of the present disclosure.

Please refer to FIG. 13A and FIG. 13B. FIG. 13A is a 3-dimensional schematic view of an electronic device 20 according to the 12th embodiment of the present disclosure. FIG. 13B is a schematic view of the electronic device 20 shown in the FIG. 13A. In the present embodiment, the electronic device 20 is a smart phone. The electronic device 20 includes the imaging apparatus 10 of the 11th embodiment, a flash module 21, a focus assist module 22, an image signal processor 23, a user interface 24, and an image software processor 25 (Please refer to FIG. 13B).

When a user utilizes the user interface 24 to capture images of the object 30 (Please refer to FIG. 13B), the electronic device 20 retrieves the light and captures an image via the imaging apparatuses 10, triggering the flash module 21 to compensate insufficient light level, and focuses instantly according to the distance information of the object 30 provided by the focus assist module 22. The images are further optimized by the image signal processor 23 to further enhance the image quality generated by the imaging optical lens. The focus assist module 22 may adopt an infrared ray or laser focus assist system to achieve quick focusing. The user interface 24 may use a touch screen or a physical shooting button cooperated with various functions of the image software processor 25 to perform image capturing and image processing.

The imaging apparatus 10 of the present disclosure is not limited to be applied to the smart phone. The imaging apparatus 10 may be used in a system of moving focus and features in both excellent aberration correction and satisfactory image quality. For example, the imaging apparatus 10 may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual realities, motion devices, home intelligent auxiliary systems and other electronic devices. The aforementioned electronic apparatus is merely exemplary of practical use of the present disclosure and does not limit the scope of application of the imaging apparatus of the present disclosure.

The aforementioned exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens, comprising six lens elements, the six lens elements being, in order from an object side to an image side:
    a first lens element having positive refractive power;
    a second lens element having an image-side surface being concave in a paraxial region thereof;
    a third lens element having an object-side surface being convex in a paraxial region thereof;
    a fourth lens element;
    a fifth lens element having positive refractive power; and
    a sixth lens element having negative refractive power,
    wherein at least one of an object-side surface of the sixth lens element and an image-side surface of the sixth lens element has at least one critical point in an off-axis region thereof, a central thickness of the second lens element is CT2, an axial distance between the first lens element and the second lens element is T12, a focal length of the imaging optical lens is f, a focal length of the fifth lens element is f5, a curvature radius of an object-side surface of the fourth lens element is R7, a curvature radius of an image-side surface of the fourth lens element is R8, a curvature radius of an image-side surface of the fifth lens element is R10, and the following conditions are satisfied:

$0 < CT2/T12 < 1.75$;

$0 \le f/|R7| + f/|R8| < 1.32$;

$0 \le f/R10$; and $1.6 < f5/f < 10$.

2. The imaging optical lens of claim 1, wherein the focal length of the imaging optical lens is f, the curvature radius of the object-side surface of the fourth lens element is R7, the curvature radius of the image-side surface of the fourth lens element is R8, and the following condition is satisfied:

$0 \le f/|R7| + f/|R8| \le 1.00$.

3. The imaging optical lens of claim 2, wherein the sixth lens element has the object-side surface being convex in a paraxial region and the image-side surface being concave in a paraxial region.

4. The imaging optical lens of claim 2, the focal length of the imaging optical lens is f, the curvature radius of the object-side surface of the fourth lens element is R7, the curvature radius of the image-side surface of the fourth lens element is R8, and the following condition is satisfied:

$0 \le f/|R7| + f/|R8| < 0.90$.

5. The imaging optical lens of claim 1, a focal length of the first lens element is f1, a focal length of the sixth lens element is f6, and the following condition is satisfied:

$|f1/f6| < 1.10$.

6. The imaging optical lens of claim 1, wherein a maximum refractive index among refractive indices of the six lens element is Nmax, and the following condition is satisfied:

$1.650 \le Nmax < 1.750$.

7. The imaging optical lens of claim 1, wherein an Abbe number of the third lens element is V3, an Abbe number of the fourth lens element is V4, and the following conditions are satisfied:

$58.0 < V3 + V4 < 103.0$; and $|V3 - V4| < 24.0$.

8. The imaging optical lens of claim 1, wherein the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$T12/T56 < 1.0$;

$T23/T56 < 1.0$;

$T34/T56 < 1.0$; and $T45/T56 < 1.0$.

9. The imaging optical lens of claim 1, wherein the axial distance between the first lens element and the second lens element is T12, an axial distance between the third lens element and the fourth lens element is T34, and the following condition is satisfied:

$1.21 < T34/T12 < 5.70$.

10. The imaging optical lens of claim 1, wherein a maximum axial distance between any two adjacent lens elements among the six lens elements is ATmax, a minimum axial distance between any two adjacent lens elements among the six lens elements is ATmin, and the following condition is satisfied:

$1.0 < ATmax/ATmin < 5.0$.

11. The imaging optical lens of claim 1, the focal length of the imaging optical lens is f, a curvature radius of the object-side surface of the third lens element is R5, a curvature radius of an image-side surface of the third lens element is R6, and the following condition is satisfied:

$1.05 < f/|R5| + f/|R6| < 6.00$.

12. The imaging optical lens of claim 1, wherein the focal length of the imaging optical lens is f, a composite focal length of the third lens element and the fourth lens element is f34, a composite focal length of the fourth lens element and the fifth lens element is f45, and the following conditions are satisfied:

$0 < f34/f < 10.0$; and $0 < f45/f < 6.60$.

13. The imaging optical lens of claim 1, wherein an axial distance between an object-side surface of the first lens element and an image surface is TL, an entrance pupil diameter of the imaging optical lens is EPD, a maximum image height of the imaging optical lens is ImgH, and the following conditions are satisfied:

$0.8 < TL/EPD < 2.4$; and $0.8 < TL/ImgH < 1.5$.

14. The imaging optical lens of claim 1, wherein at least five lens elements among the sixth lens elements have both a curvature radius of an object-side surface and a curvature radius of an image-side surface thereof being positive.

15. The imaging optical lens of claim 1, wherein the third lens element has an image-side surface being concave in a paraxial region.

16. An imaging apparatus, comprising the imaging optical lens of claim 1 and an image sensor disposed on an image surface of the imaging optical lens.

17. An electronic device, comprising the imaging apparatus of claim 16.

18. An imaging optical lens, comprising six lens elements, the six lens elements being, in order from an object side to an image side:
a first lens element having positive refractive power;
a second lens element having negative refractive power;
a third lens element having an object side-surface being convex in a paraxial region thereof;
a fourth lens element;
a fifth lens element having positive refractive power; and
a sixth lens element,
wherein at least one of an object-side surface of the fifth lens element, an image-side surface of the fifth lens element, an object-side surface of the sixth lens element, and an image-side surface of the sixth lens element has at least one critical point in an off-axis region thereof, a central thickness of the second lens element is CT2, an axial distance between the first lens element and the second lens element is T12, a focal length of the imaging optical lens is f, a curvature radius of an object-side surface of the fourth lens element is R7, a curvature radius of an image-side surface of the fourth lens element is R8, a curvature radius of the object-side surface of the fifth lens element is R9, a focal length of the first lens element is f1, a focal length of the sixth lens element is f6, an Abbe number of the third lens element is V3, and Abbe number of the fourth lens element is V4, and the following conditions are satisfied:

$0 < CT2/T12 < 2.15$;

$0 \leq f/|R7| + f/|R8| < 1.32$;

$0 \leq f/R9$;

$0.30 < |f1/f6| < 0.90$; and $58.0 < V3 + V4 < 103.0$.

19. The imaging optical lens of claim 18, wherein the focal length of the imaging optical lens is f, the curvature radius of the object-side surface of the fourth lens element is R7, the curvature radius of the image-side surface of the fourth lens element is R8, and the following condition is satisfied:

$0 \leq f/|R7| + f/|R8| \leq 1.00$.

20. The imaging optical lens of claim 18, wherein the second lens element has an object-side surface being convex in a paraxial region thereof.

21. The imaging optical lens of claim 18, wherein the third lens element has positive refractive power.

22. The imaging optical lens of claim 18, wherein the third lens element has an image-side surface being concave in a paraxial region thereof.

23. The imaging optical lens of claim 18, wherein three consecutive lens elements among the six lens elements have Abbe numbers lower than 48.

24. An imaging optical lens, comprising six lens elements, the six lens elements being, in order from an object side to an image side:
a first lens element having positive refractive power;
a second lens element having an object-side surface being convex in a paraxial region thereof;
a third lens element having an object-side surface being convex in a paraxial region thereof and an image-side surface being concave in a paraxial region thereof;
a fourth lens element;
a fifth lens element; and
a sixth lens element,
wherein a central thickness of the second lens element is CT2, an axial distance between the first lens element and the second lens element is T12, an axial distance between the third lens element and the fourth lens element is T43, a focal length of the imaging optical lens is f, a curvature radius of an object-side surface of the fourth lens element is R7, a curvature radius of an image-side surface of the fourth lens element is R8, a curvature radius of an image-side surface of the fifth lens element is R10, a focal length of the first lens element is f1, a focal length of the sixth lens element is f6, and the following conditions are satisfied:

$0 < CT2/T12 < 2.15$;

$0 \leq f/|R7| + f/|R8| \leq 1.00$;

$0 \leq f/R10$;

$0.30 < |f1/f6| < 0.90$; and $1.21 < T34/T12 < 5.70$.

25. The imaging optical lens of claim 24, wherein the central thickness of the second lens element is CT2, the axial distance between the first lens element and the second lens element is T12, and the following condition is satisfied:

$0 < CT2/T12 < 1.75$.

26. The imaging optical lens of claim 24, wherein the focal length of the imaging optical lens is f, the curvature radius of the object-side surface of the fourth lens element is R7, the curvature radius of the image-side surface of the fourth lens element is R8, and the following condition is satisfied:

$0 \leq f/|R7| + f/|R8| < 0.90$.

27. The imaging optical lens of claim 24, wherein three consecutive lens elements among the six lens elements have Abbe numbers lower than 48.

28. The imaging optical lens of claim 24, wherein at least five lens elements among the sixth lens elements have both a curvature radius of an object-side surface and a curvature radius of an image-side surface thereof being positive.

29. The imaging optical lens of claim 24, wherein the second lens element has an image-side surface being concave in a paraxial region thereof.

* * * * *